(12) United States Patent
Satou et al.

(10) Patent No.: US 10,821,554 B2
(45) Date of Patent: Nov. 3, 2020

(54) METHOD OF MANUFACTURING CONDUCTIVE MEMBER AND CONDUCTIVE MEMBER

(71) Applicant: SUMITOMO WIRING SYSTEMS, LTD., Mie (JP)

(72) Inventors: Osamu Satou, Mie (JP); Masamichi Yamagiwa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/469,425

(22) PCT Filed: Nov. 29, 2017

(86) PCT No.: PCT/JP2017/042782
§ 371 (c)(1),
(2) Date: Jun. 13, 2019

(87) PCT Pub. No.: WO2018/116764
PCT Pub. Date: Jun. 28, 2018

(65) Prior Publication Data
US 2019/0358749 A1    Nov. 28, 2019

(30) Foreign Application Priority Data
Dec. 19, 2016    (JP) .................................. 2016-245342

(51) Int. Cl.
*B23K 26/38*    (2014.01)
*B23K 26/21*    (2014.01)
(Continued)

(52) U.S. Cl.
CPC .............. *B23K 26/38* (2013.01); *B23K 26/21* (2015.10); *H01B 5/02* (2013.01); *H01B 13/0036* (2013.01);
(Continued)

(58) Field of Classification Search
CPC .......... B23K 26/38; B23K 26/21; H01R 5/02; H01R 4/023; H01R 4/625; H01R 43/02; H01B 13/0036
(Continued)

(56) References Cited

U.S. PATENT DOCUMENTS 5,082,461 A * 1/1992 Minnis ................ H01R 4/5041
439/786
5,906,759 A * 5/1999 Richter .................... A61F 2/91
219/121.63
(Continued)

FOREIGN PATENT DOCUMENTS

JP    51-079675    6/1976
JP    56-089168    7/1981
(Continued)

OTHER PUBLICATIONS

Official Communication issued in International Bureau of WIPO Patent Application No. PCT/JP2017/042782, dated Feb. 20, 2018.

*Primary Examiner* — Hien D Vu
(74) *Attorney, Agent, or Firm* — Greenblum & Bernstein, P.L.C.

(57) ABSTRACT

A method of manufacturing a conductive member includes (a) a step of preparing a long conductive member provided with a cutting target in an extension direction portion, and (b) a step of firing a high energy-density beam at the cutting target while moving the high energy-density beam in a direction that intersects with the extension direction of the long conductive member, and also cutting the cutting target at, at least, a portion where the high energy-density beam moves, such that a dimension of the cutting target in a firing direction of the high energy-density beam gradually increases.

12 Claims, 18 Drawing Sheets

(51) Int. Cl.
*H01B 5/02* (2006.01)
*H01B 13/00* (2006.01)
*H01R 4/02* (2006.01)
*H01R 43/02* (2006.01)
*B23K 103/10* (2006.01)
*B23K 103/12* (2006.01)
*B23K 101/38* (2006.01)
*H01R 11/12* (2006.01)

(52) U.S. Cl.
CPC ............ *H01R 4/023* (2013.01); *H01R 43/02* (2013.01); *B23K 2101/38* (2018.08); *B23K 2103/10* (2018.08); *B23K 2103/12* (2018.08); *H01R 11/12* (2013.01)

(58) Field of Classification Search
USPC .......................................................... 439/874
See application file for complete search history.

(56) References Cited

U.S. PATENT DOCUMENTS

| | | | |
|---|---|---|---|
| 9,812,234 B2 * | 11/2017 | dos Santos e Lucato | ................... H01R 13/523 |
| 10,395,793 B2 * | 8/2019 | Satou | ........................ H01R 4/18 |
| 2012/0318576 A1 | 12/2012 | Koto | |

FOREIGN PATENT DOCUMENTS

| | | |
|---|---|---|
| JP | 01-168913 | 11/1989 |
| JP | 02-220791 | 9/1990 |
| JP | 2003-086037 | 3/2003 |
| JP | 2012-152823 | 8/2012 |
| JP | 2013-004411 | 1/2013 |
| JP | 2016-055326 | 4/2016 |

\* cited by examiner

METHOD OF MANUFACTURING CONDUCTIVE MEMBER AND CONDUCTIVE MEMBER

FIELD OF THE INVENTION

The present invention relates to a technology for cutting a long conductive member to manufacture a conductive member that is used as a wiring material or the like in a vehicle.

BACKGROUND OF THE INVENTION

As disclosed in Patent Literature 1, a wiring material in a vehicle or the like is manufactured by connecting an end portion of an electrical wire to a terminal or another electrical wire.

In addition to a generic electrical wire, a braided wire in which metal wire is braided into a tubular shape or the like may also be used as the wiring material. In either case, the generic electrical wire and braided wire are both manufactured in a form that is long and continuous, and therefore when manufacturing the wiring material, a step of cutting the braided wire or a core wire contained in the electrical wire is essential.

RELATED ART

Patent Literature

Patent Literature 1: Japanese Patent Laid-open Publication No. 2013-004411

SUMMARY OF THE INVENTION

Problems to be Solved by the Invention

In this regard, cutting an elongated conductive member with a high energy-density beam such as a laser beam is investigated by the inventors of the present application.

However, as illustrated in FIG. 35, when a laser beam 910 moves in a width direction of a conductive member 900 and attempts to cut the conductive member 900, it may not be possible to completely cut the conductive member 900 in the initial period of a displacement path of the laser beam 910.

Specifically, the laser beam 910 is absorbed by a portion close to a surface at which the laser beam 910 is fired, and heating is centered on this portion. In addition, from a vantage point of constraining equipment costs, cutting that uses a laser beam seeks to cut a member using a lower output. Because of this, due to the material or thickness of a member, there may be cases where there is difficulty adequately heating an interior of the conductive member 900 to reach the melting point thereof in an initial period portion of the displacement path of the laser beam 910. Meanwhile, in a region where the laser beam 910 has displaced a certain amount, the heat imparted to the displacement path of the laser beam 910 up to that point builds up cumulatively, and therefore the interior of the conductive member 900 can be adequately heated to reach the melting point thereof.

Therefore, when the laser beam 910 moves along the width direction of the conductive member 900, a cuttable depth D that can be cut by the laser beam 910 exhibits characteristics of being smaller in the initial period of the displacement path and, as the laser beam 910 advances, of gradually increasing and finally stabilizing.

Therefore, as illustrated in FIG. 36, for example, when attempting to cut a conductive member 900A having a rectangular cross-section with the laser beam 910, a case may arise where the conductive member 900A cannot be cut in the initial period of the displacement path of the laser beam 910. Also, as illustrated in FIG. 37, when attempting to cut a conductive member 900B having a circular cross-section with the laser beam 910, a case may similarly arise where the conductive member 900B cannot be cut in the initial period of the displacement path of the laser beam 910.

In order to cut the conductive members 900A and 900B in the initial period of the displacement path of the laser beam 910, cases may be considered where the laser beam 910 is configured to a higher output, the displacement speed of the laser beam 910 is slowed, or the like to increase the energy density imparted per unit area. However, this gives rise to a need for using an expensive laser device that is capable of high output, invites a shortened lifespan of a laser device as a result of continuous laser emission at a setting close to the maximum output of the laser device, lengthens the time required for cutting, and the like.

In view of this, the present invention is configured to enable a long conductive member to be more completely cut in as short a time as possible by a high energy-density beam with as low an output as possible.

Means for Solving the Problems

In order to resolve the above-noted issues, a method of manufacturing a conductive member according to a first aspect includes (a) a step of preparing a long conductive member provided with a cutting target in an extension direction portion, and (b) a step of firing a high energy-density beam at the cutting target while moving the high energy-density beam in a direction that intersects with the extension direction of the long conductive member, and also cutting the cutting target at, at least, a portion where the high energy-density beam moves, such that a dimension of the cutting target in a firing direction of the high energy-density beam gradually increases.

A second aspect is the method of manufacturing the conductive member according to the first aspect in which, in step (a), an extension direction portion of the long conductive member is formed as the cutting target, which has a portion that is processed such that a thickness dimension gradually increases in a cross-sectional view orthogonal to the extension direction of the long conductive member, and in step (b), the high energy-density beam is fired at the cutting target while moving in the direction in which the thickness dimension gradually increases, and cuts the cutting target.

A third aspect is the method of manufacturing the conductive member according to the second aspect in which, in step (a), the extension direction portion of the long conductive member is formed as the cutting target, which has a portion that is processed such that, in a cross-sectional view orthogonal to the extension direction of the long conductive member, the thickness dimension gradually increases from two sides thereof toward a middle portion thereof.

A fourth aspect is the method of manufacturing the conductive member according to the second or third aspect in which, in step (a), the extension direction portion of the long conductive member is formed as the cutting target, which has a portion where, in a cross-sectional view orthogonal to the extension direction of the long conductive member, the thickness dimension is fixed at a width-direction middle portion thereof.

A fifth aspect is the method of manufacturing the conductive member according to any one of the second to fourth aspects in which, in step (a), the extension direction portion of the long conductive member is formed as the cutting target, in which a cross-sectional view orthogonal to the extension direction of the long conductive member exhibits a trapezoidal shape.

A sixth aspect is the method of manufacturing the conductive member according to the first aspect in which, in step (a), a cutting target is prepared which is rectangular in a cross-sectional view orthogonal to the extension direction of the long conductive member, and in step (b), the high energy-density beam is fired along a direction that is oblique with respect to four faces of the cutting target.

A seventh aspect is the method of manufacturing the conductive member according to any one of the first to sixth aspects, in which the long conductive member is a member that collects a plurality of strands to create a wire shape, and in which step (a) includes a step of applying pressure to the plurality of strands.

An eighth aspect is the method of manufacturing the conductive member according to the seventh aspect, in which step (a) includes a step of bonding the plurality of strands to each other.

A ninth aspect is the method of manufacturing the conductive member according to any one of the first to eighth aspects in which, in step (b), a displacement speed of the high energy-density beam increases partway through.

A tenth aspect is the method of manufacturing the conductive member according to any one of the first to ninth aspects, further including a step (c) in which the cutting target that is cut in step (b) is connected to a terminal.

In order to resolve the above-noted issues, a conductive member according to a sixteenth aspect is formed of a conductive material in an elongated shape; has striated thermal cutting marks made by a high energy-density beam formed on an end face on at least one side of the conductive member; and moreover, has the end face formed in a shape having a cutting marks trapezoidal portion that includes a portion that is processed such that a thickness dimension gradually increases from two sides thereof toward a middle portion thereof, and a portion formed in a shape having a portion where the thickness dimension is fixed at a width-direction middle portion thereof; and a direction orthogonal to an extension direction of the thermal cutting marks is a direction oriented from one side of the end face toward the other side.

A twenty-first aspect is the conductive member according to the sixteenth aspect, in which the conductive member is a member that collects a plurality of strands to create a wire shape, and, at the end face, pressure is applied to the plurality of strands, creating a state where the strands are more tightly packed than other portions.

A twenty-second aspect is the conductive member according to the twenty-first aspect in which, at the end face, the plurality of strands are in a state of being bonded to each other.

A twenty-third aspect is the conductive member according to any one of the sixteenth, twenty-first and twenty-second aspects, in which a terminal is connected to at least one of the end portions.

Effect of the Invention

According to the first aspect, the high energy-density beam is fired at the cutting target while moving the high energy-density beam in the direction that intersects with the extension direction of the long conductive member, and also the cutting target is cut at, at least, a portion where the high energy-density beam moves, such that the dimension of the cutting target in the firing direction of the high energy-density beam gradually increases, and therefore at an initial period of a displacement path of the high energy-density beam, the high energy-density beam is fired at a portion of the cutting target with a comparatively small thickness dimension. Therefore, at the initial period of the displacement path of the high energy-density beam, the cutting target can easily be completely cut even without increasing the output of the high energy-density beam or slowing the displacement speed or the like. In addition, from a midway point onward in the displacement path of the high energy-density beam, heat imparted to the displacement path of the high energy-density beam up to that point builds up cumulatively, and therefore a portion of the cutting target where the thickness dimension is comparatively large can also easily be completely cut. As a result, the long conductive member can be more completely cut in as short a time as possible by a high energy-density beam with as low an output as possible.

According to the second aspect, the extension direction portion of the long conductive member is formed as the cutting target, which has a portion that is processed such that the thickness dimension gradually increases in a cross-sectional view orthogonal to the extension direction of the long conductive member, and the high energy-density beam is fired at the cutting target while moving in the direction in which the thickness dimension gradually increases, and cuts the cutting target. Therefore, as described with the first aspect, the long conductive member can be more completely cut in as short a time as possible by a high energy-density beam with as low an output as possible.

According to the third aspect, the extension direction portion of the long conductive member is formed in a shape where, in a cross-sectional view orthogonal to the extension direction of the long conductive member, the thickness dimension gradually increases from two sides thereof toward a middle portion thereof. Therefore, no matter which side portion of the cutting target cutting begins from in step (b), the conductive member can be more completely cut in as short a time as possible by a high energy-density beam with as low an output as possible. Also, by moving the laser beam more quickly midway along or at a terminal end of the displacement path than in the initial period of cutting, cutting can also be performed in a shorter amount of time.

According to the fourth aspect, in a state where cutting with the high energy-density beam has advanced a certain degree and the cuttable depth stabilizes somewhat, efficient cutting can be performed with the high energy-density beam.

According to the fifth aspect, the extension direction portion of the long conductive member is formed as the cutting target, in which a cross-sectional view orthogonal to the extension direction of the long conductive member exhibits a trapezoidal shape. Therefore, no matter which side portion of the cutting target cutting begins from in step (b), the conductive member can be more completely cut in as short a time as possible by a high energy-density beam with as low an output as possible.

According to the sixth aspect, the cutting process of step (b) can be performed on a rectangular cutting target.

According to the seventh aspect, step (a) includes the step of applying pressure to the plurality of strands, and therefore the plurality of strands are unlikely to separate at the portion where the cutting target is cut, the end portion of the conductive member.

According to the eighth aspect, the plurality of strands are bonded to each other, and therefore the strands of the end portion of the conductive member are unlikely to separate after the cutting target is cut.

According to the ninth aspect, midway along or at the terminal end of the displacement path, the cumulative heat up to that point accumulates in the material, and therefore even when the laser beam moves more quickly than in the initial period of cutting, the energy density applied to a cut portion can be equivalent to the initial period of the displacement path. Therefore, by moving the laser beam more quickly midway along or at the terminal end of the displacement path than in the initial period of cutting up to that point, cutting can be accomplished in a shorter amount of time as compared to when cutting at a fixed displacement speed.

According to the tenth aspect, the end portion of the conductive member can be connected to the terminal while inhibiting separation of the strands.

According to the sixteenth aspect, the conductive member is formed of a conductive material in an elongated shape; has striated thermal cutting marks made by the high energy-density beam formed on the end face on at least one side of the conductive member; and moreover, has the end face formed in a shape having a trapezoidal portion that includes a portion that is processed such that the thickness dimension gradually increases from two sides thereof toward a middle portion thereof, and a portion formed in a shape having a portion where the thickness dimension is fixed at a width-direction middle portion thereof; and a direction orthogonal to the extension direction of the thermal cutting marks is a direction oriented from one side of the end face toward the other side. Therefore, the high energy-density beam can be fired at the cutting target of the long conductive member while moving in the direction in which the thickness dimension gradually increases. Accordingly, at the initial period of the displacement path of the high energy-density beam, the high energy-density beam can be fired at a portion of the cutting target with a comparatively small thickness dimension. Therefore, at the initial period of the displacement path of the high energy-density beam, the cutting target can easily be completely cut even without increasing the output of the high energy-density beam or slowing the displacement speed or the like. In addition, from a midway point onward in the displacement path of the high energy-density beam, heat imparted to the displacement path of the high energy-density beam up to that point builds up cumulatively, and therefore a portion of the cutting target where the thickness dimension is comparatively large can also easily be cut completely. As a result, the long conductive member can be more completely cut in as short a time as possible by a high energy-density beam with as low an output as possible.

According to the sixteenth aspect, the end face includes a portion that is processed such that the thickness dimension gradually increases from two sides thereof toward the middle portion thereof, and therefore no matter which side portion cutting begins from, the conductive member can be more completely cut in as short a time as possible by a high energy-density beam with as low an output as possible.

According to the sixteenth aspect, the end face includes a portion where the thickness dimension is fixed at the width-direction middle portion thereof, and therefore in a state where cutting with the high energy-density beam has advanced a certain degree and the cuttable depth stabilizes somewhat, efficient cutting can be performed with the high energy-density beam.

According to the twenty-first aspect, the plurality of strands are unlikely to separate at the end portion of the conductive member.

According to the twenty-second aspect, the plurality of strands are bonded to each other, and therefore the strands of the end portion of the conductive member are unlikely to separate after the cutting target is cut.

According to the twenty-third aspect, the end portion of the conductive member can be connected to the terminal while inhibiting separation of the strands.

MODE FOR CARRYING OUT THE INVENTION

First Embodiment

In the following, a method of manufacturing a conductive member, a long conductive member, and a conductive member according to a first embodiment are described.

First, a manufacturing method of a conductive member is described.

Figure 1:
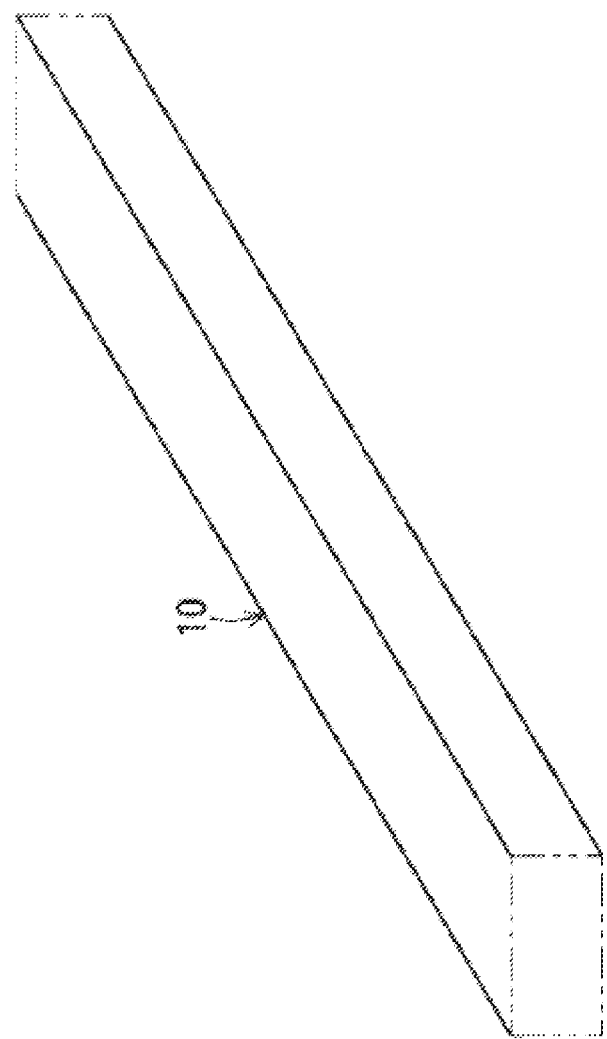
FIG. 1 is a schematic perspective view illustrating a long conductive member according to a first embodiment.

As illustrated in FIG. 1, a long conductive member 10 is prepared. The long conductive member 10 is a long member formed of a conductive material such as metal, and has a length dimension that is capable of producing multiple conductive members that are to be manufactured. The long conductive member 10 is formed of copper, a copper alloy, aluminum, or an aluminum alloy, for example. A plating of tin or the like may be formed on the surface of the long conductive member 10. The long conductive member 10 is formed in a shape where an identical cross-sectional shape is continuous along the extension direction of the member. In this example, the long conductive member 10 is formed in a shape where a cross-section in a direction orthogonal to the extension direction of the member has a rectangular shape (rectangular shape that is long in one direction). As noted below, a long conductive member may have other shapes, such as a circular cross-section. In addition, the long conductive member may be configured by a single member, or may be a member in which a plurality of strands are collected to form a wire shape. Here, an example is described in which the long conductive member 10 is configured by a single long, thin metallic member. Examples where the long conductive member is a member in which a plurality of strands are collected to form a wire shape are described in the second and third embodiments. The long conductive member 10 may also be covered by an insulating coating or the like, or may be uncovered. Here, an example is described in which the long conductive member 10 is not covered by an insulating coating or the like. An example where the long member is covered by an insulating coating is described in the second embodiment.

Figure 2:
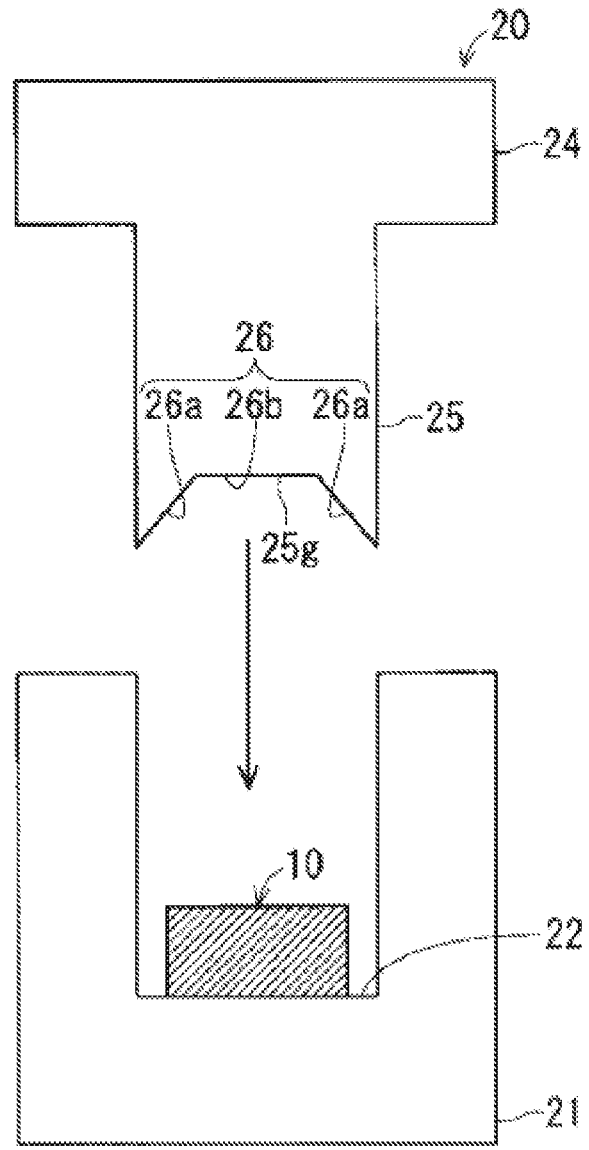
FIG. 2 is an explanatory diagram illustrating a step of forming a cutting target in the long conductive member.
Figure 3:
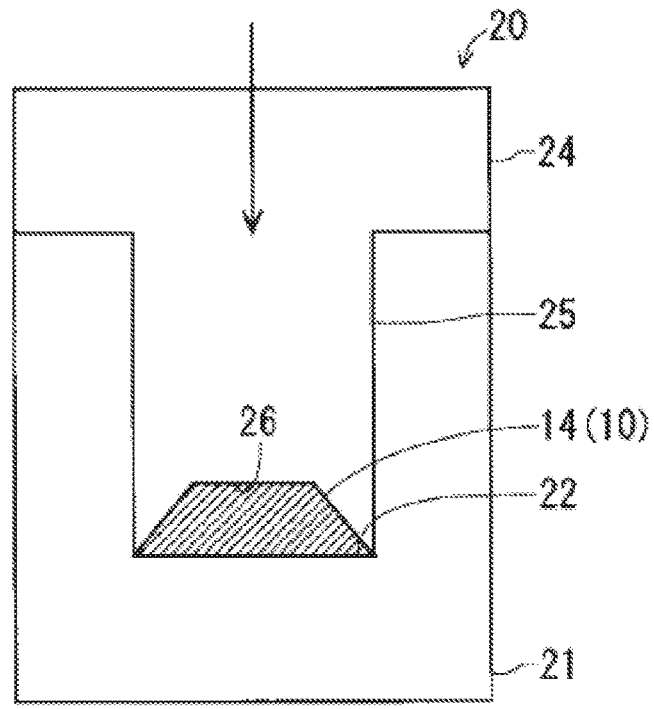
FIG. 3 is an explanatory diagram illustrating the step of forming the cutting target in the long conductive member.
Figure 4:
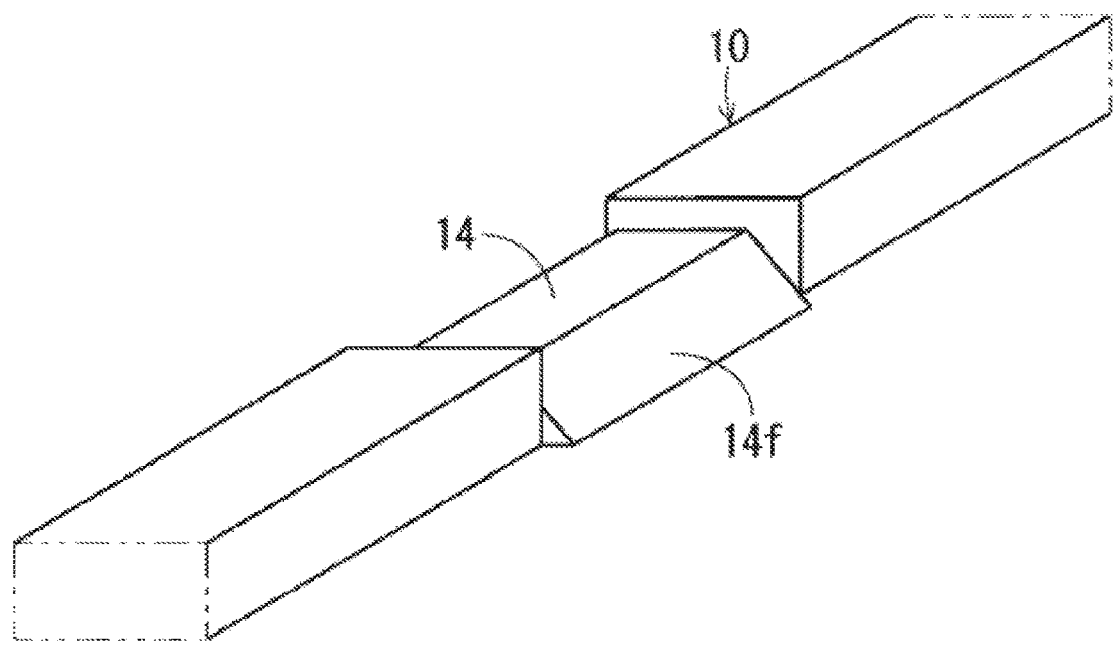
FIG. 4 is a schematic perspective view illustrating a state where the cutting target is formed in the long conductive member.

As illustrated in FIGS. 2 to 4, a portion of the long conductive member 10 in the extension direction is formed into a cutting target 14 (step (a)). The cutting target 14 is formed in a shape having a portion that is processed such that, in a cross-sectional view orthogonal to the extension direction of the long conductive member 10, a thickness direction gradually increases.

The cutting target 14 can be made using a metal die 20 that includes a lower mold 21 and an upper mold 24, for example. Specifically, the lower mold 21 and the upper mold 24 are members formed of a metal or the like that is a hard material with a higher melting point than the long conductive member 10. A trench-shaped lower mold surface 22 recessed downward from above is formed in the lower mold 21. In this example, the lower mold surface 22 is formed in a rectangular trench shape. A projection 25 that projects downward and that can be arranged within the lower mold surface 22 is formed on the upper mold 24. A trench 25g that opens downward is formed on a bottom end portion of the projection 25. The trench 25g is formed as a trapezoidal groove in cross-section that gradually narrows toward the top. An upper mold surface 26 is formed by two side surfaces 26a that incline upward and inward on both sides of the trench 25g, and a ceiling surface 26b that links the upper edge portions of the two side surfaces 26a.

Figure 5:
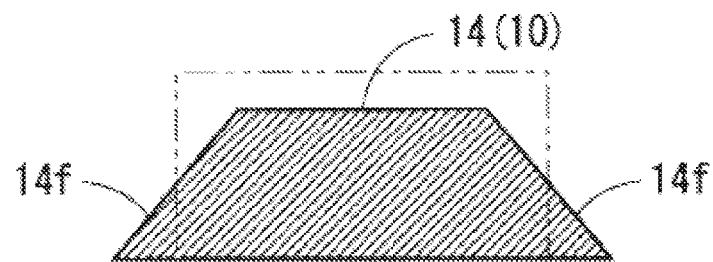
FIG. 5 is an explanatory diagram illustrating a cross-section of the cutting target and an external shape of other portions of the long conductive member.

In addition, in a state where an extension-direction middle portion of the long conductive member 10 is accommodated within the lower mold surface 22, the projection 25 presses in from above the lower mold surface 22 and applies pressure so as to compress the extension-direction middle portion of the long conductive member 10 between the lower mold surface 22 and the upper mold surface 26. When this happens, the extension-direction middle portion of the long conductive member 10 is plastically deformed, and a middle portion thereof is formed into the cutting target 14, which has a shape corresponding to the shape of the space delineated by the lower mold surface 22 and the upper mold surface 26 (see FIG. 4). In this example, the extension-direction middle portion of the long conductive member 10 is formed into the cutting target 14, which has a trapezoidal shape (in this example, an isosceles trapezoidal shape) where, in a cross-sectional view orthogonal to the extension direction of the long conductive member 10, a top edge portion is larger than a lower edge portion. When the cutting target 14 is observed in a cross-sectional view orthogonal to the extension direction of the long conductive member 10, the thickness direction of the two side portions of the cutting target 14 gradually increases (in this example, increases linearly) as they approach the middle portion from an exterior. Specifically, portions of the long conductive member 10 except the cutting target 14 are formed to be rectangular in cross-section, and therefore the two side surfaces thereof stand more or less perpendicular to a bottom surface. Therefore, the two side portions of portions of the long conductive member 10 except the cutting target 14 are portions where a thickness dimension increases drastically. In contrast, two side surfaces 14f of the cutting target 14 are formed to be flat inclined surfaces that incline upward toward a width-direction middle portion of the cutting target 14 from two side edge portions of a bottom surface thereof (see FIG. 5). Therefore, the two side portions of the cutting target 14 are processed such that the thickness dimension gradually increases toward the width-direction middle portion thereof.

In the present embodiment, the two side portions of the cutting target 14 are processed such that the thickness dimension gradually increases toward the width-direction middle portion thereof, but it is also possible to process only one side portion of the cutting target 14 such that the thickness dimension gradually increases toward the width-direction middle portion thereof.

In addition, the cutting target 14, when observed in the above-noted cross-sectional view, is formed as a trapezoid and therefore the width-direction middle portion of the cutting target 14 is formed at a portion where the thickness dimension is fixed. It is not strictly necessary that the thickness dimension of the width-direction middle portion of the cutting target be fixed, and therefore when observed in the above-noted cross-sectional view, the cutting target may also have a triangular shape. Cases where the cutting target 14 is formed in a trapezoidal shape include not only cases where an upper base is shorter than a lower base, but also cases where the lower base is shorter than the upper base.

Figure 6:
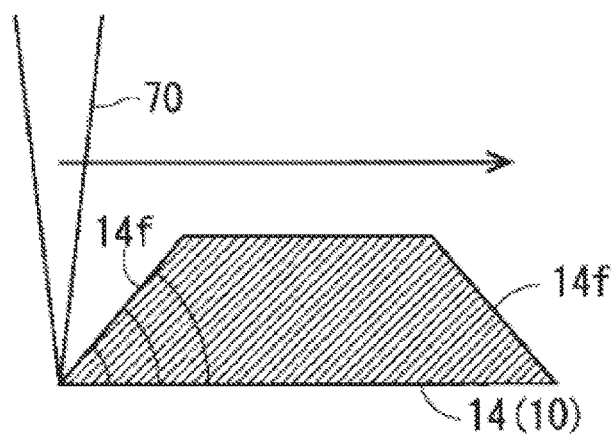
FIG. 6 is an explanatory diagram illustrating a step of cutting the cutting target.

Also, as illustrated in FIG. 6, a high energy-density beam is fired at the cutting target 14 while moving in the direction in which the thickness dimension of the cutting target 14 gradually increases, and cuts the cutting target 14 (step (b)). Arcs described in FIG. 6, for example, represent the transmission of heat, centered on a site where the high energy-density beam is fired at the cutting target 14.

Examples of the high energy-density beam may include a laser beam 70, an electron beam, or the like. In this example, the laser beam 70 is fired at the cutting target 14. The wavelength of the laser beam 70 is not particularly limited and, for example, laser beams of wavelengths such as 532 nm (called a green laser), 1030 nm (called a disk laser), 1064 nm (called an yttrium aluminum garnet (YAG) laser; may also be an Nd:YAG laser, which oscillates with a substance having Nd added to YAG), 1070 to 1080 nm (called a fiber laser), or the like can be used.

The laser beam 70 is fired in a direction that follows the thickness direction of the cutting target 14, cuts across the cutting target 14 from one side edge portion of the cutting target 14 (that is, from the portion where the thickness dimension is smallest), and is fired while moving so as to reach the other side edge portion of the cutting target 14. A displacement path of the laser beam 70 may follow a direction orthogonal to the extension direction of the cutting target 14, or may be a direction that is oblique relative to the extension direction of the cutting target 14. A displacement speed of the laser beam 70 is not particularly limited, and the laser beam 70 may be displaced at a fixed speed, or the displacement speed may be increased partway through. When the displacement speed of the laser beam 70 is increased partway through, cutting can be performed in a shorter amount of time.

In an initial period of displacement of the laser beam 70, the energy absorbed at the other side edge portion of the cutting target 14 from the laser beam 70 is slight. However, this portion has a small thickness dimension. Therefore, even in the initial period of displacement of the laser beam 70, the first side edge portion of the cutting target 14 can be cut adequately.

Figure 35:
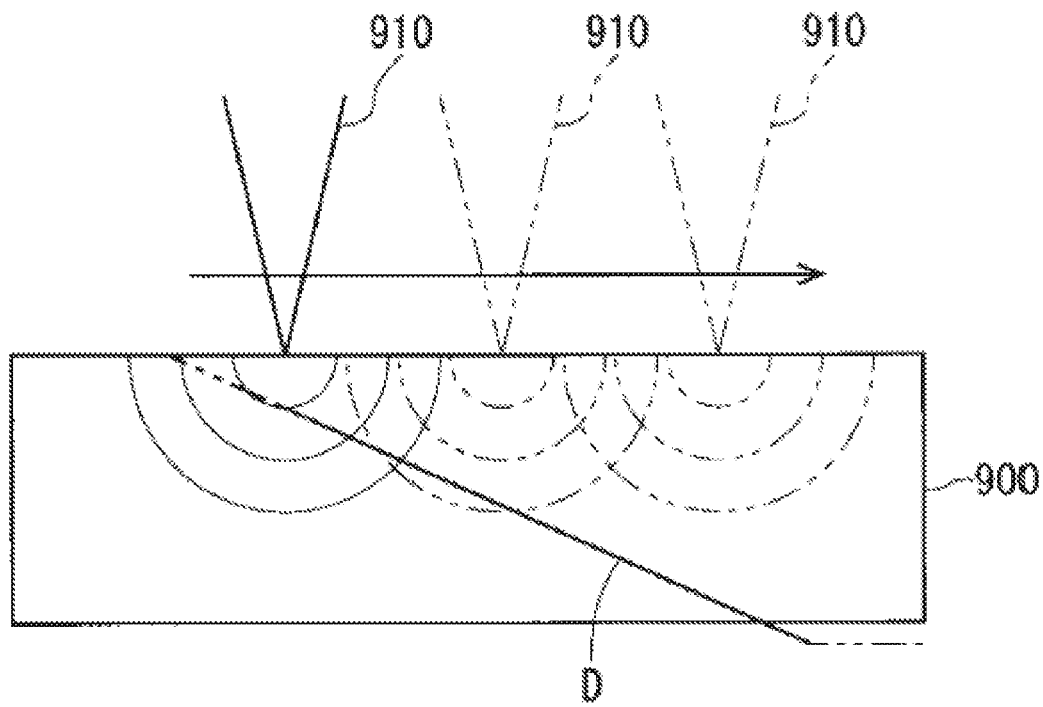
FIG. 35 is an explanatory diagram illustrating an issue when cutting a conductive member using a laser beam.
Figure 36:
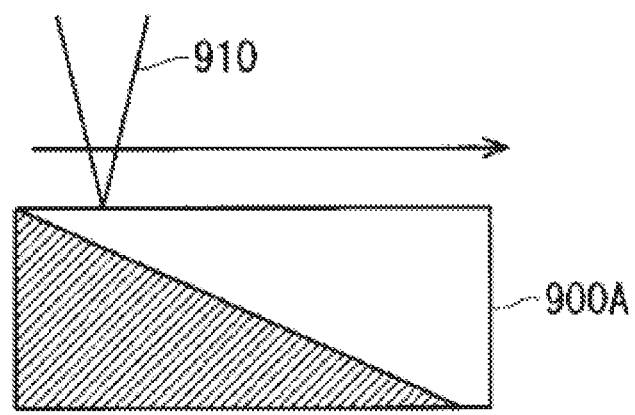
FIG. 36 is an explanatory diagram illustrating an issue when cutting a conductive member using a laser beam.
Figure 37:
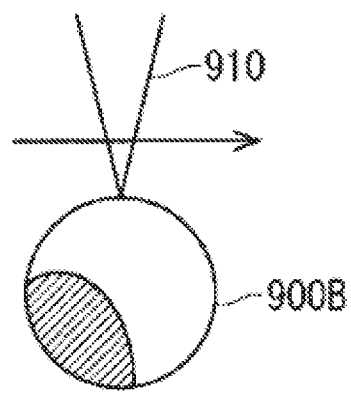
FIG. 37 is an explanatory diagram illustrating an issue when cutting a conductive member using a laser beam.

When the laser beam 70 moves toward the width-direction middle portion of the cutting target 14, the heat imparted to the laser beam 70 displacement path up to that point builds up cumulatively. Therefore, adequate heat is imparted to the cutting target 14 in conjunction with the laser beam 70 moving toward the width-direction middle portion of the cutting target 14. Therefore, a cuttable depth to which the laser beam 70 is able to cut gradually increases in conjunction with the laser beam 70 moving toward the width-direction middle portion of the cutting target 14 (see cuttable depth D in FIG. 35). Therefore, the side portions of the cutting target 14 where the thickness dimension gradually increases toward the width-direction middle portion can be adequately cut by the laser beam 70.

When the laser beam 70 displaces a certain amount, once the cuttable depth that can be cut by the laser beam 70 has increased a certain amount, it is more or less fixed. Therefore, the width-direction middle portion of the cutting target 14, where the thickness direction is more or less fixed, can be adequately cut. The output and displacement speed of the laser beam 70 is preferably set to a size that enables the width-direction middle portion of the cutting target 14, where the thickness direction is more or less fixed, to be cut. However, partway through cutting, when sufficient heat has accumulated in the cutting target 14 due to the cutting up to that point, cutting speed may also be increased partway through the cutting.

By continuing to move the laser beam 70 toward the other side edge portion of the cutting target 14, cutting can be performed so as to divide the cutting target 14. The laser beam 70 may also be fired at the cutting target 14 from a portion on a wide width side (in FIG. 6, from below).

Figure 7:
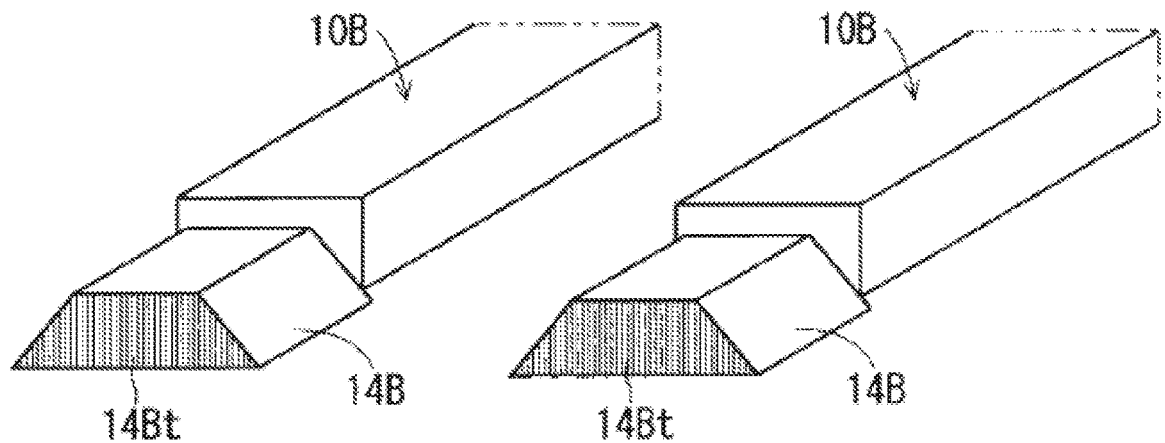
FIG. 7 is a schematic perspective view illustrating conductive members.

When the long conductive member 10 is cut at the extension-direction middle portion of the cutting target 14 as described above, a plurality of conductive members 10B can be produced, as illustrated in FIG. 7. The conductive members 10B are formed of a conductive material in an elongated shape, an end portion 14B (end face) on at least one side thereof is formed in a shape having two side portions where the thickness dimension gradually increases, and thermal cutting marks 14Bt made by the high energy-density beam are formed on the end face. The thermal cutting marks 14Bt have a configuration of thin striated unevenness formed along the thickness direction (firing direction of the laser beam 70) of the end face of the conductive member 10B, for example.

Figure 8:
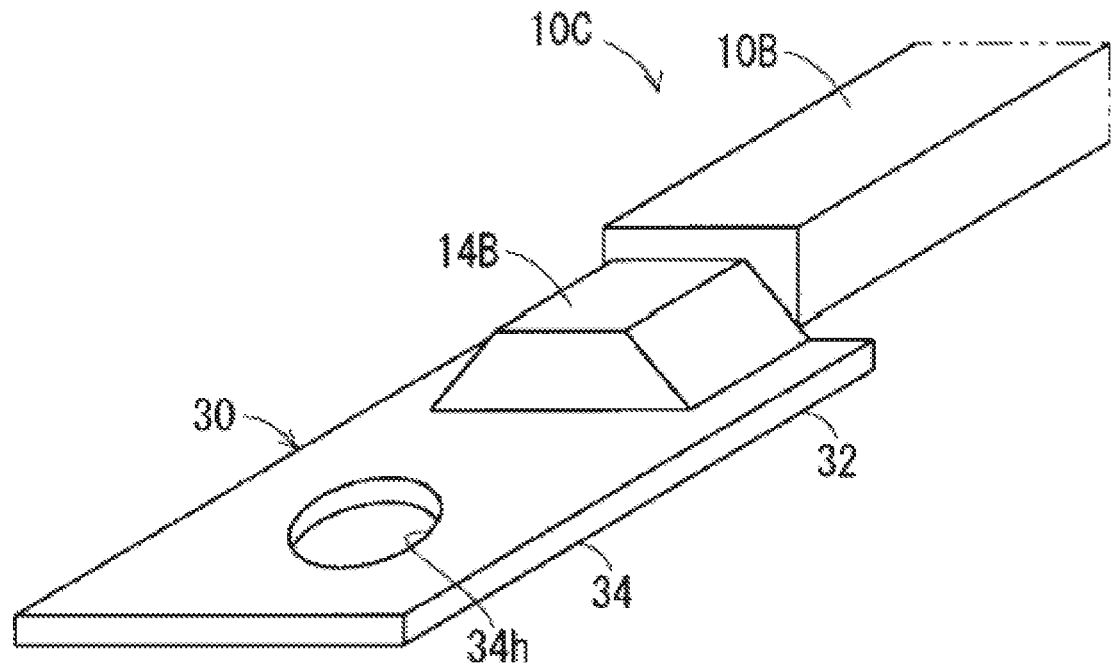
FIG. 8 is a schematic perspective view illustrating a terminal-equipped conductive member.

FIG. 8 is a schematic perspective view illustrating a terminal-equipped conductive member 10C that includes the conductive member 10B. The terminal-equipped conductive member 10C is provided with the conductive member 10B and a terminal 30.

The terminal 30 is a metallic plate member formed of copper, a copper alloy, or the like. A plating such as tin plating may also be formed on the surface of the terminal 30. A wire connection portion 32 is formed at one end portion of the terminal 30, and the other end portion is formed into a mating connection portion 34. The wire connection portion 32 is formed in a plate-like shape. The mating connection portion 34 is the portion to which the conductive member 10B is to be connected. In this example, the mating connection portion 34 is formed into a plate-like portion provided with a hole 34h. Also, in a state where a bolt is inserted through the hole 34h, where the bolt stands upright on a mating conductive portion (metal plate or the like) to which the mating connection portion 34 is to be connected, a nut is threadably mounted and fastened to the bolt. Accordingly, the mating connection portion 34 is held between the conductive portion and the nut, and a state can be maintained in which the mating connection portion 34 is in contact with and electrically in contact with the conductive portion. The mating connection portion 34 may have a pin- or tab-like male terminal shape, or may have a cylindrical female terminal shape.

By adding a step (step (c)) where the terminal 30 is connected to the end portion 14B of the conductive member 10B, on the cut side of the cutting target 14, the terminal-equipped conductive member 10C, which is one type of conductive member, is produced.

In this example, the end portion 14B of the conductive member 10B is welded to one principal surface of the wire connection portion 32. In this example, the wire connection portion 32 and the end portion 14B are laser welded in a state where a plane (bottom surface) on the wide width side of the end portion 14B is in surface contact with the one principal surface of the wire connection portion 32. Besides laser welding, welding of the terminal and the end portion of the conductive member may be performed with ultrasonic welding, resistance welding, or the like. Also, the terminal and the end portion of the conductive member may be soldered together. A crimping portion may also be formed on the terminal and the crimping portion may be crimped and connected to the end portion of the conductive member.

According to the above method of manufacturing the conductive member 10B, the long conductive member 10, and the conductive member 10B, an extension direction portion of the long conductive member 10 is formed as the cutting target 14, which has a portion where the thickness dimension gradually increases in a cross-sectional view orthogonal to the extension direction of the long conductive member 10. Also, a high energy-density beam such as the laser beam 70 is fired at the cutting target 14 while moving in the direction in which the thickness direction of the cutting target 14 gradually increases. Therefore, at the initial period of the displacement path of the high energy-density beam, the high energy-density beam is fired at a portion of the cutting target 14 with a comparatively small thickness dimension. Therefore, even at the initial period of the displacement path of the high energy-density beam, the side edge portion on one side of the cutting target 14 can easily be completely cut even without increasing the output of the high energy-density beam or slowing the displacement speed or the like. In addition, from a midway point onward in the displacement path of the high energy-density beam, heat imparted to the displacement path of the high energy-density beam up to that point builds up cumulatively, and therefore a portion of the cutting target 14 where the thickness dimension is comparatively large (width-direction middle portion, or the like) can easily be cut completely. As a result, the long conductive member 10 can be more completely cut in as short a time as possible by a high energy-density beam with as low an output as possible. Accordingly, a low-output laser processing device can also be used, and a high-output laser processing device can be used at a low output and its lifespan can be extended.

In addition, midway along or at a terminal end of the displacement path, the cumulative heat up to that point accumulates in the cutting target 14, and therefore even when the laser beam moves more quickly than in the initial period of cutting, the energy density applied to the cut portion can be equivalent to the initial period of the displacement path. Therefore, by moving the laser beam more quickly midway along or at a terminal end of the displacement path than in the initial period of cutting up to that point, cutting can also be accomplished in a shorter amount of time as compared to cutting at a fixed displacement speed.

Also, in step (a), an extension direction portion of the long conductive member 10 is formed as the cutting target 14, which has a shaped portion where, in a cross-section orthogonal to the extension direction of the long conductive member 10, the thickness dimension gradually increases from the two sides thereof toward the middle portion thereof. Therefore, when executing step (b), even when the high energy-density beam is moved from a first side edge portion of the cutting target 14 toward a second side edge portion, and conversely even when the high energy-density beam is moved from the second side edge portion of the cutting target 14 toward the first side edge portion, the cutting target 14 can be more completely cut in as short a time as possible with a high energy-density beam having as low an output as possible.

Also, in step (a), an extension direction portion of the long conductive member 10 is formed as the cutting target 14, which has a portion where, in a cross-sectional view orthogonal to the extension direction of the long conductive member 10, the thickness dimension is fixed in the width direction of the member. When cutting with the high energy-density beam advances a certain degree, the cuttable depth stabilizes somewhat, and therefore by setting the cuttable depth to exceed (preferably, only slightly exceed) the portion of the long conductive member 10 where the thickness dimension is fixed, efficient cutting can be performed with the high energy-density beam.

Figure 9:
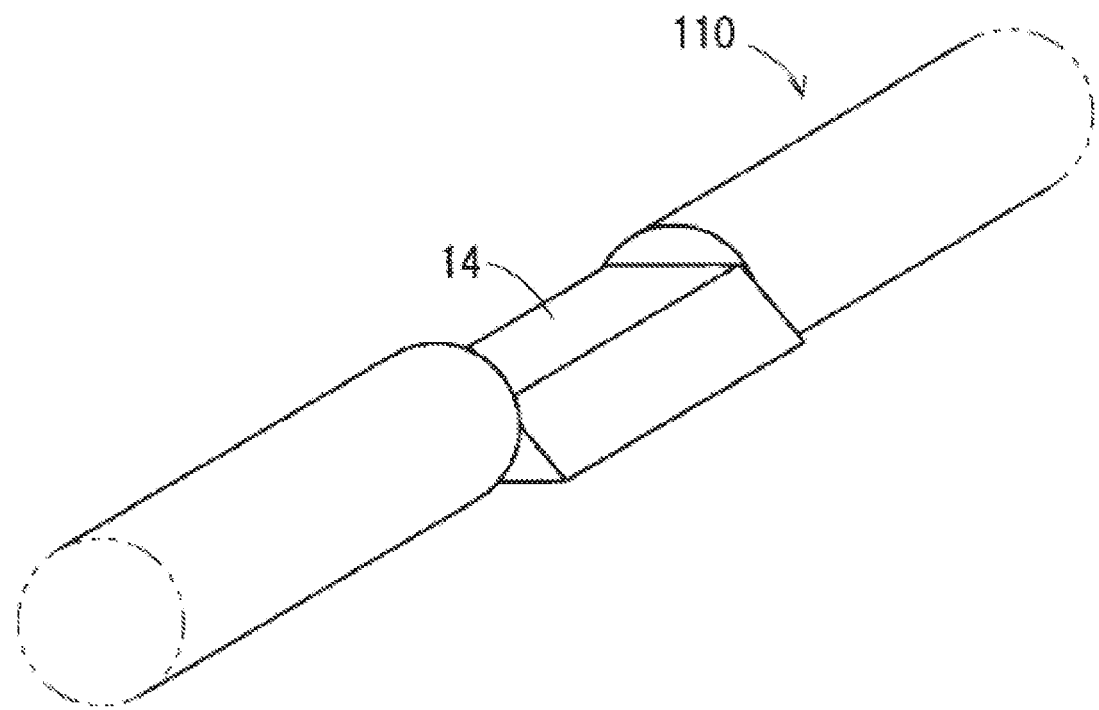
FIG. 9 is a schematic perspective view illustrating a state where a cutting target is formed in a long conductive member according to a modification.
Figure 10:
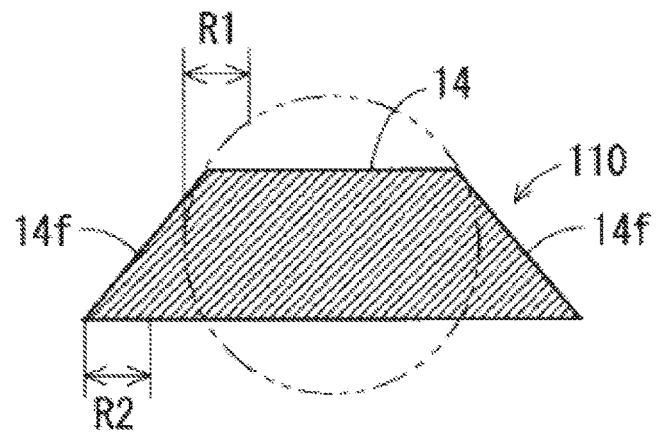
FIG. 10 is an explanatory diagram illustrating a cross-section of the cutting target and an external shape of other portions of the long conductive member.

In the first embodiment, the long conductive member 10 is formed in a shape where a rectangular cross-section is continuous along the extension direction of the member, but this is not strictly necessary. For example, as illustrated in FIG. 9, a long conductive member 110 may also be formed in a shape where a circular cross-section is continuous along the extension direction of the member, i.e., a round rod shape, and an extension-direction middle portion of the member may be formed as a cutting target 14 similar to that described in the first embodiment. In such a case, as illustrated in FIG. 10, when observing a cross-sectional view of the long conductive member 110 other than the portion where the cutting target 14 is formed, a region R1 from one side portion of the member toward a middle portion has a shape where the thickness dimension suddenly increases in accordance with the circular arced shape. Therefore, when the high energy-density beam fires while moving so as to traverse this circular cross-section portion of the long conductive member 110, the high energy-density beam may not be able to completely cut the circular cross-section portion of the long conductive member 110 on the initial displacement path. In contrast, in the cutting target 14, a region R2 from one side portion thereof toward the middle portion has a shape where the thickness dimension gradually increases in accordance with an inclination angle of an inclined side surface 14a. Therefore, similar to the description in the first embodiment, cutting can be performed more completely in as short a time as possible by a high energy-density beam with as low an output as possible, as compared to the case of cutting the round cross-section portion of the long conductive member 110.

That is, a portion where an extension direction portion of a long conductive member is processed such that the thickness dimension gradually increases in a cross-sectional view orthogonal to the extension direction of the long conductive member can be said to be a portion that is processed such that a degree of thickness dimension change in the width direction of the cutting target 14 becomes more gradual as compared to other, non-processed portions (portions not forming the cutting target 14). The portion that is processed in this way, such that the degree of thickness dimension change in the width direction of the cutting target 14 becomes more gradual, is preferably formed at one or both sides of the long conductive member.

In the first embodiment, an example is described where the long conductive member is configured by a single member, but because the cutting target is a portion formed by compression with a metal die or the like, so long as the long conductive member is a member that collects a plurality of strands to create a wire shape, by forming a cutting target as described above, the external shape can be formed into the desired shape while the plurality of strands are processed into a tightly packed state and separation thereof can also be inhibited.

In the second and third embodiments that follow, examples are described where the long conductive member is a member in which a plurality of strands are collected to create a wire shape.

Second Embodiment

A method of manufacturing a conductive member, a long conductive member, and a conductive member according to a second embodiment are described. In the description of the present embodiment, configuration elements that are similar to those described in the second embodiment are assigned the same reference numerals and the explanation thereof is omitted, and the description primarily focuses on differences from the first embodiment.

First, a manufacturing method of a conductive member is described.

Figure 11:
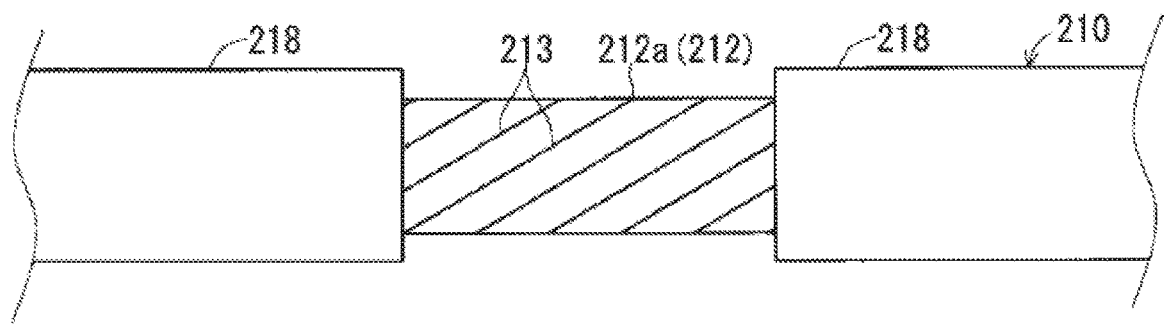
FIG. 11 is a schematic side view illustrating an electrical wire according to a second embodiment.
Figure 12:
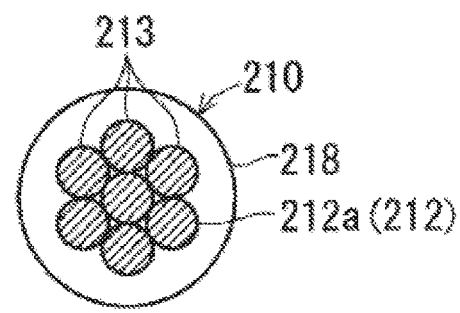
FIG. 12 is a cross-sectional view of the electrical wire.

As illustrated in FIGS. 11 and 12, an electrical wire 210 having a core wire 212 is prepared as the long conductive member.

The electrical wire 210 includes the core wire 212 and a coating 218.

The core wire 212 collects a plurality of strands 213 so as to create a wire shape. The plurality of strands 213 may be twisted together, or may not be twisted together. In this example, the strands 213 are collected such that one strand 213 is surrounded by six strands 213. Therefore, when the core wire 212 is observed in a cross-sectional view orthogonal to the extension direction, the core wire 12 creates a substantially circular external diameter. However, the number of strands is not limited to this example. Each of the strands 213 is formed of a metal wire such as aluminum, an aluminum alloy, copper, or a copper alloy. A plating such as tin plating may be formed on the surface of each of the strands 213.

The coating 218 is an insulating portion that covers a circumference of the core wire 212. The coating 218 is, for example, formed by extrusion coating or the like of an insulating material such as resin onto the circumference of the core wire 212.

The coating 218 is stripped away at the extension-direction middle portion of the electrical wire 210, forming a core wire exposure portion 212a where the core wire 212 is exposed.

Figure 13:
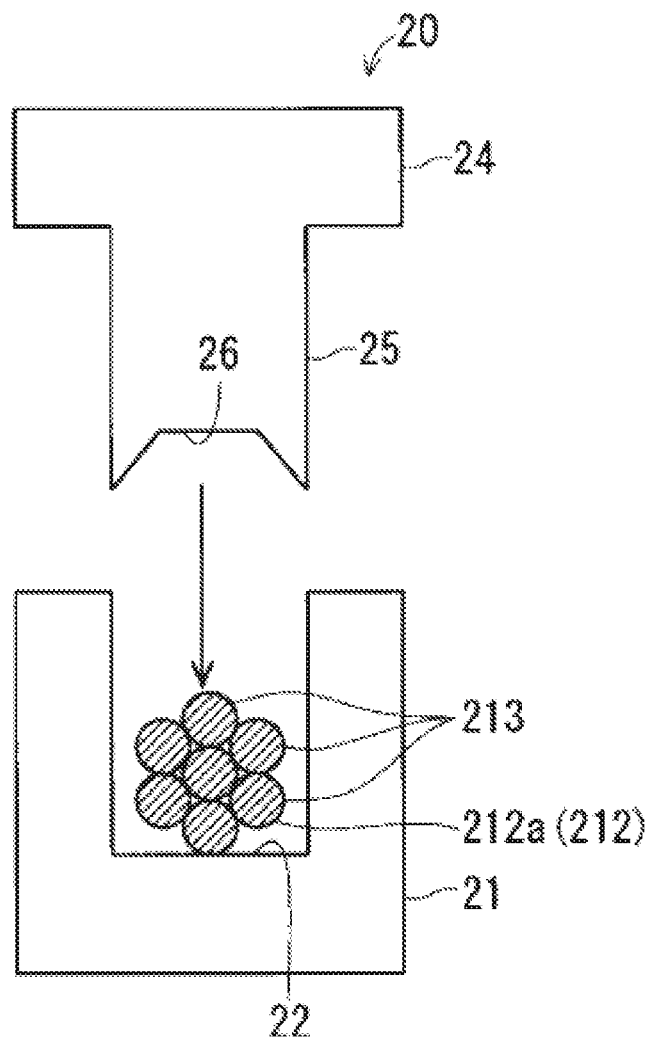
FIG. 13 is an explanatory diagram illustrating a step of forming a cutting target in a core wire of the electrical wire.
Figure 14:
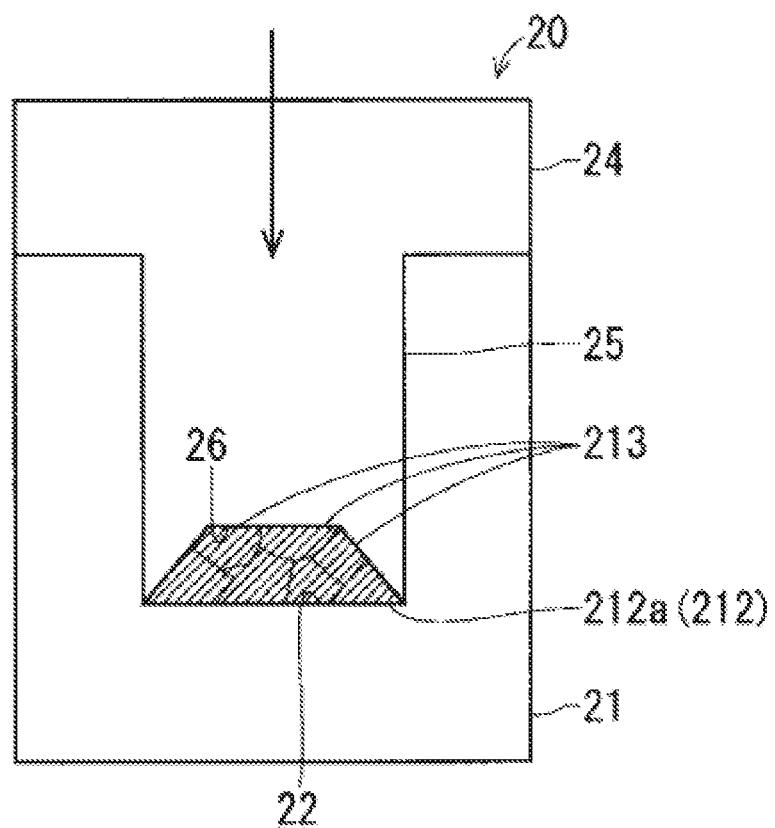
FIG. 14 is an explanatory diagram illustrating a step of forming the cutting target in the core wire of the electrical wire.
Figure 15:
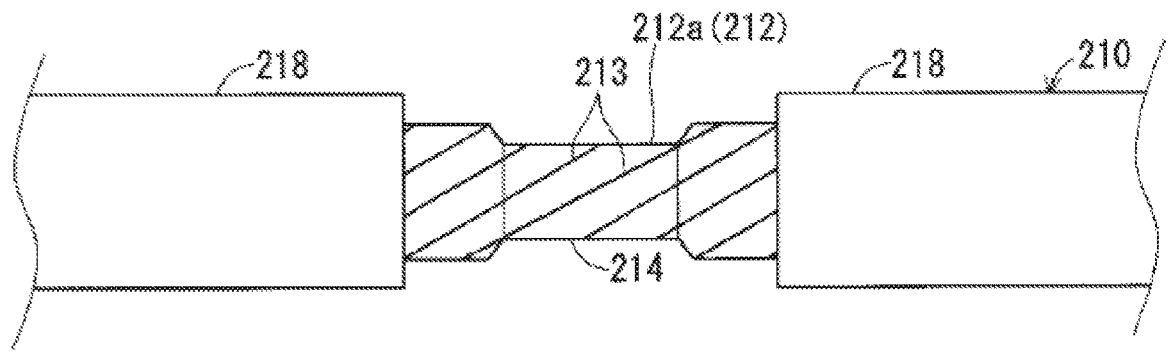
FIG. 15 is a schematic side view illustrating a state where the cutting target is formed in the electrical wire.

As illustrated in FIGS. 13 to 15, a middle portion of the core wire exposure portion 212a, which is an extension-direction middle portion of the core wire 212, is formed into a cutting target 214 (step (a)). Similar to the description given in the first embodiment, the step of forming the core wire 212 into the cutting target 214 can be performed using the metal die 20 that includes the lower mold 21 and the upper mold 24, for example. Specifically, in a state where the middle portion of the core wire exposure portion 212a is accommodated within the lower mold surface 22, the projection 25 presses in from above the lower mold surface 22 and applies pressure so as to compress the extension-direction middle portion of the core wire exposure portion 212a between the lower mold surface 22 and the upper mold surface 26. When this happens, pressure is applied to each of the strands 213 at the extension-direction middle portion of the core wire exposure portion 212a, the strands 213 go through an elastic deformation region, are plastically deformed, and are collected, and are formed into the cutting target 214, which has a shape corresponding to the shape of the space delineated by the lower mold surface 22 and the upper mold surface 26 (see FIGS. 14 and 15). Each of the strands 213 initially have a circular cross-section, but when pressure is applied in a compression direction, the strands 213 deform between the lower mold surface 22 and the upper mold surface 26 so as to fill gaps between each of the strands 213, and pressure is applied to the plurality of strands 213 to create a state where the strands 213 are more tightly packed than other portions. Through this deformation, a newly formed surface is created on the surface of each of the strands 213, and each of the strands 213 cohere to each other. Accordingly, the cutting target 214 is formed in which the plurality of strands 213 are maintained in a collected form. The shape of the cutting target 214 is the same as the shape of the cutting target 14 described in the first embodiment.

Step (a) in which the cutting target 214 is formed as described above preferably includes a step where the plurality of strands 213 are bonded to each other. In the present embodiment, the cutting target 214 undergoes non-pressure welding to form a cutting target 214a.

Figure 16:
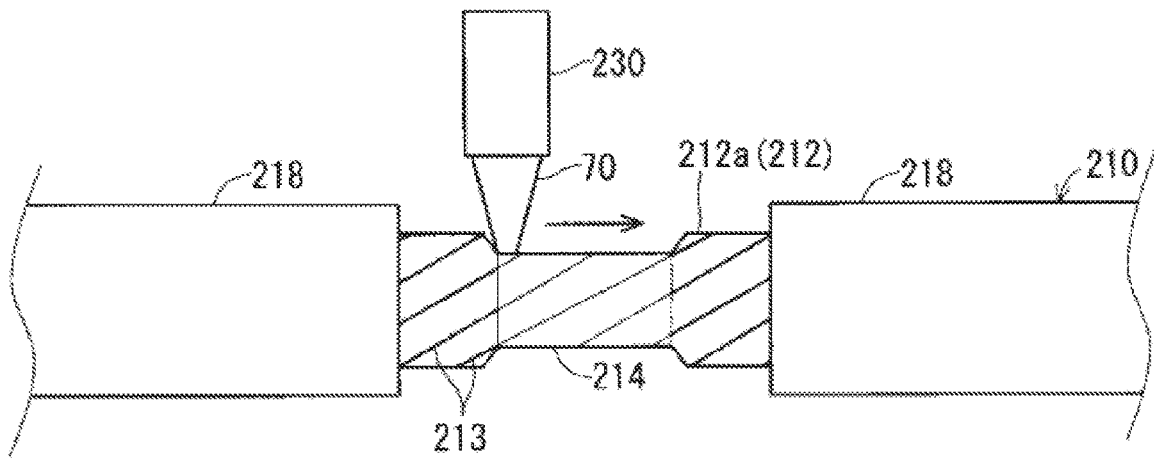
FIG. 16 is an explanatory diagram illustrating a step of bonding strands of the cutting target together.

In this example, non-pressure welding refers to imparting energy from an outside source to weld each of the strands 213 to each other without applying pressure to the cutting target 214 (the welding target) from an outside source. For example, a method of striking the cutting target 214 with the high energy-density beam to perform welding, such as laser welding where the laser beam 70 is fired from a nozzle 230 onto the cutting target 214 and the strands 213 are welded to each other (see FIG. 16), electron beam welding where an electron beam collides with the cutting target 214 and the strands 213 are welded to each other by the heat generated thereby, or the like falls under methods of non-pressure welding. In addition, tungsten inert gas (TIG) welding or the like, as well as arc welding in which the strands 213 are welded to each other using an arc released into the air, also fall under methods of non-pressure welding.

In this example, the plurality of strands 213 are welded to each other by laser welding, in which the laser beam 70 is fired from the nozzle 230 onto the cutting target 214 and the strands 213 are welded to each other.

The wavelength of the laser beam is not particularly limited and, for example, laser beams of wavelengths such as 532 nm (called a green laser), 1030 nm (called a disk laser), 1064 nm (called an yttrium aluminum garnet (YAG) laser; may also be an Nd:YAG laser, which oscillates with a substance having Nd added to YAG), 1070 to 1080 nm (called a fiber laser), or the like can be used.

When manufacturing the bonded cutting target 214a, the cutting target 214 is preferably welded such that the plurality of strands 213 are kept in a wire shape. For example, a configuration is preferred in which plating is formed on the surface of the plurality of strands 213, and during welding, primarily the surface plating melts while the strands 213 do not melt or largely do not melt, and the strands 213 are bonded to each other by the melted plating. For example, in a case where the melting point of the material forming the plating is low relative to the melting point of the material forming the strands 213, welding is carried out in conditions where primarily the plating can be melted. More specifically, when the strands 213 are formed of aluminum (melting point of approximately 660°) or copper (melting point of approximately 1085°) and the plating is tin plating (the melting point of tin being approximately 232°), the output, emission time, and the like of the laser beam is adjusted and welding is carried out in conditions where only the tin plating is melted.

However, even when plating is not provided on the strands 213, the embodiment may be configured so that a laser beam is fired and welding is performed such that primarily the surface of the strands close to the surface of the cutting target 214 are melted, and thus a form is achieved where the plurality of strands 213 are collected while preserving the wire shape.

In addition, within a scope that can preserve the shape of the cutting target 214 as much as possible, all or a portion (for example, the strands 213 close to the surface) of the plurality of strands 213 may also melt at first and break down the wire shape.

Accordingly, an extension direction portion of the core wire 212 (conductive member) in which the plurality of strands 213 are collected to create a wire shape more reliably maintains the shape that forms the cutting target 214a, and also each strand 213 becomes less likely to separate.

The step of bonding the plurality of strands 213 to each other can be executed by a method other than those noted above, as well. For example, when applying pressure to the core wire exposure portion 212a with the metal die 20, pressure may be applied with the metal die 20 heated, at least a portion of the strands 213 may be melted, and thereby the strands 213 may be bonded to each other. In particular, a configuration is preferred in which plating is formed on the surface of the strands 213, and during welding, primarily the surface plating melts while the strands 213 do not melt or largely do not melt, and the strands 213 are bonded to each other by the melted plating. Similar to the above, for example, in a case where the melting point of the material forming the plating is low relative to the melting point of the material forming the strands 213, pressure is favorably applied by the metal die 20 in conditions where primarily the plating can be melted.

Figure 17:
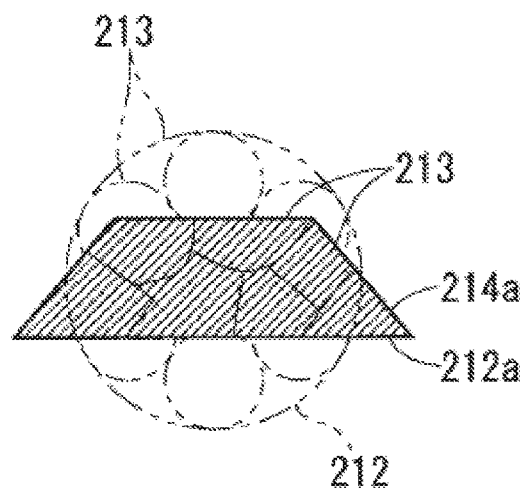
FIG. 17 is an explanatory diagram illustrating a cross-section of the cutting target and an external shape of other portions of the core wire.

As illustrated in FIG. 17, the cutting target 214a formed in this way is formed in a shape having a shaped portion where, in a cross-sectional view orthogonal to the extension direction of the cutting target 214a, the thickness dimension gradually increases in the width direction on two side surfaces 14f as compared to substantially circular cross-section portions of the core wire 212 other than the cutting target 214a.

Figure 18:
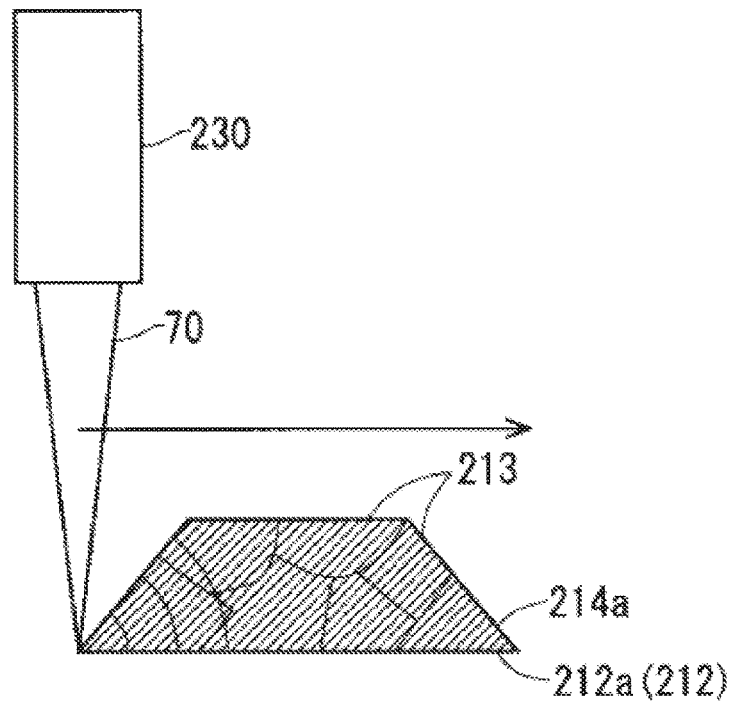
FIG. 18 is an explanatory diagram illustrating a step of cutting the cutting target.
Figure 19:
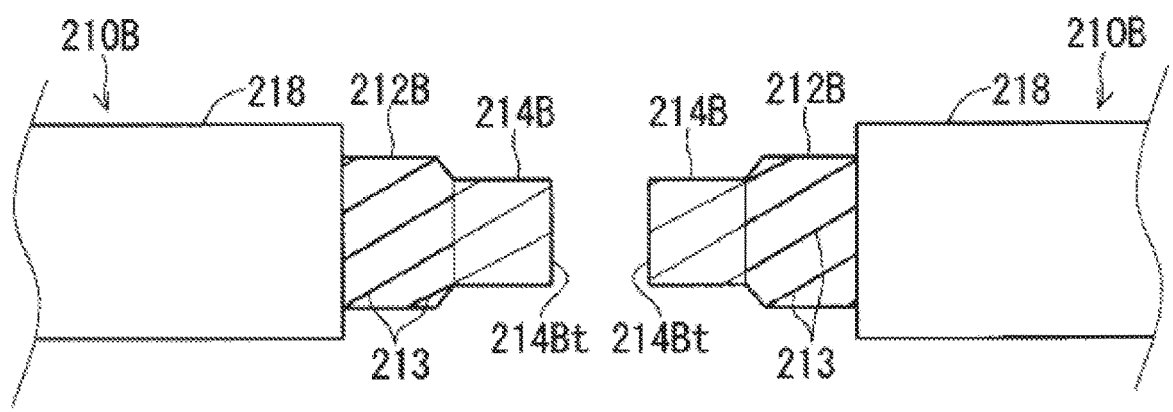
FIG. 19 is a schematic side view of the electrical wires.
Figure 20:
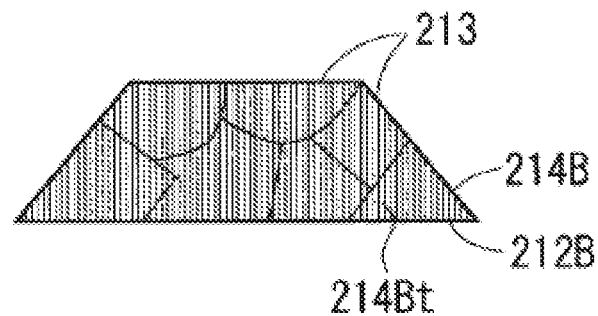
FIG. 20 is an explanatory diagram illustrating an end face of the electrical wire.

Also, as illustrated in FIG. 18, a high energy-density beam (in this example, the laser beam 70) is fired at the cutting target 214a while moving in the direction in which the thickness dimension of the cutting target 214a gradually increases, and cuts the cutting target 214a (step (b)). When this happens, as illustrated in FIGS. 19 and 20, an electrical wire 210B is produced that is formed of a conductive material in an elongated shape, and an end portion 214B (end face) on at least one side thereof has a core wire 212B (conductive member) that is formed in a shape having two side portions where the thickness dimension gradually increases. Thermal cutting marks 214Bt made by the high energy-density beam are formed on the end face of the end portion 214B. The plurality of strands 213 are collected and maintained in a tightly packed state at the end portion 214B. In addition, the thermal cutting marks 214Bt have a configuration of thin striated unevenness formed along the thickness direction (firing direction of the laser beam 70) of the end face of the end portion 214B, for example, because assist gas for blowing away molten metal is ejected together with the firing of the laser beam. A plurality of the electrical wires 210B having the end portion 214B formed at both ends can be manufactured by forming the cutting target 214a at a plurality of locations, with intervals between, in the extension direction of the electrical wire 210 and cutting the extension-direction middle portion of each of the cutting targets 214a as described above. The assist gas may be nitrogen, oxygen, a mixture thereof, argon gas, or air in the atmosphere.

Effects similar to those of the first embodiment can also be achieved according to the second embodiment.

At the end portion of the electrical wire 210B, the plurality of strands 213 are in a pressed, collected form, and therefore each of the strands 213 is unlikely to separate after cutting. In particular, in the present embodiment, the plurality of strands 213 are in a bonded form, and therefore the plurality of strands 213 are even more unlikely to separate. Therefore, when the end portion of the electrical wire 210B is connected to another conductive member, the end portion of the electrical wire 210B can be readily connected to the other conductive member while inhibiting separation of the strands 213.

Figure 21:
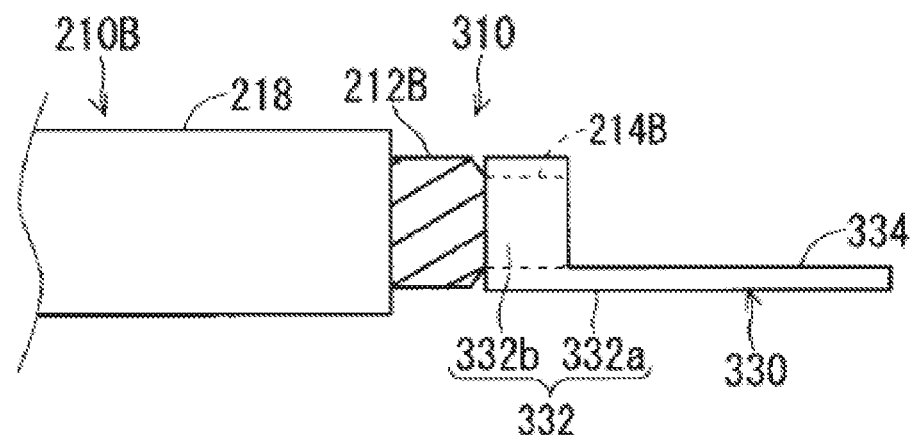
FIG. 21 is an explanatory diagram illustrating a terminal-equipped electrical wire.

For example, a terminal-equipped electrical wire 310 illustrated in FIG. 21 includes the electrical wire 210B and a terminal 330.

The terminal 330 is a metallic plate member formed of copper, a copper alloy, or the like. A plating such as tin plating may also be formed on the surface of the terminal 330. A wire connection portion 332 is formed at one end portion of the terminal 330, and the other end portion is formed into a mating connection portion 334. The mating connection portion 334 can have a similar configuration to that of the mating connection portion 34 of the terminal 30 described in the first embodiment.

The wire connection portion 332 is a portion formed to be capable of crimping to the end portion 214B. More specifically, the wire connection portion 332 includes a bottom portion 332a and a pair of crimping tabs 332b that stand upright on two sides of the bottom portion 332a. In addition, in a state where the end portion 214B is arranged on the bottom portion 332a, by plastically deforming the pair of crimping tabs 332b inward, the wire connection portion 332 is crimped and connected to the end portion 214B in a state where the end portion 214B is surrounded by the bottom portion 332a and the pair of crimping tabs 332b (step (c)).

In the case of this example, the wire connection portion 332 is crimped to the end portion 214B where the plurality of strands 213 are compressed and collected as described above, and therefore the strands 213 are unlikely to separate and stick out from the connection portion.

Figure 22:
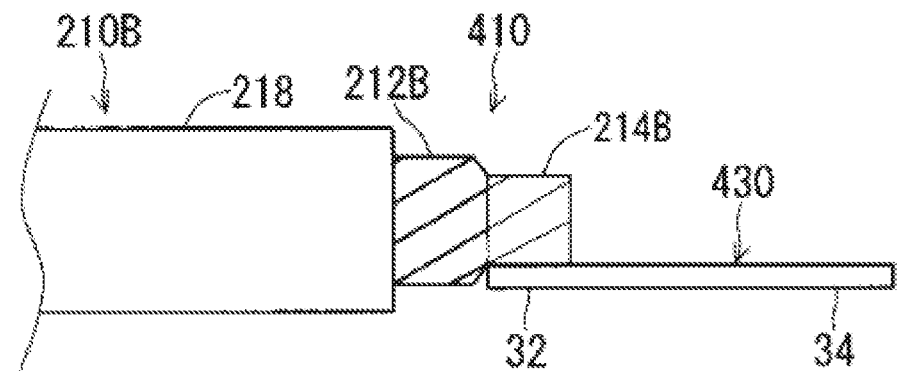
FIG. 22 is an explanatory diagram illustrating another terminal-equipped electrical wire.

Also, a terminal-equipped conductive member 410 illustrated in FIG. 22 includes the electrical wire 210B and a terminal 430.

The terminal 430 has a similar configuration to that of the terminal 30 described in the first embodiment, with the wire connection portion 32 formed at one end portion, and the other end portion formed into the mating connection portion 34.

In addition, the end portion 214B of the electrical wire 210B is connected to the wire connection portion 32. The connection between the end portion 214B and the wire connection portion 32 is created by welding such as laser welding, ultrasonic welding, or resistance welding, or by soldering or the like.

In the case of this example, the end portion 214B where the plurality of strands 213 are compressed and collected can be connected to the wire connection portion 32 by welding, soldering, or the like, and therefore they can be connected in a state inhibiting separation of the strands 213 and in a state where the end portion 214B is pressed against the wire connection portion 32 and is in contact that is as stable as possible.

Figure 23:
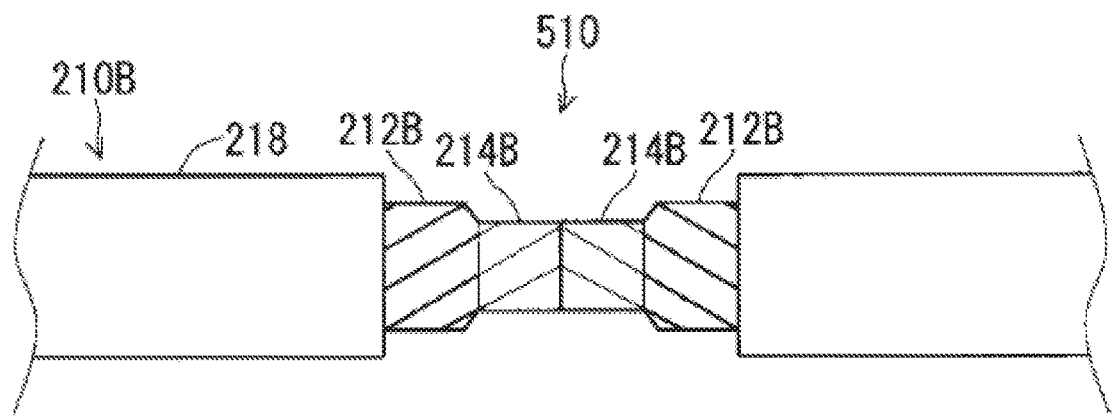
FIG. 23 is a side view illustrating a connection structure of the electrical wires.

Also, a connection structure 510 of the electrical wire 210B illustrated in FIG. 23 includes a plurality (two) of the electrical wires 210B. The end faces of the end portions 214B of the two electrical wires 210B are connected to each other in a state where the end faces are opposite each other. The connection is created by welding such as laser welding, or by soldering or the like.

In the case of this example, the end portions 214B where the plurality of strands 213 are compressed and collected are brought opposite each other and can be connected by welding, soldering, or the like, and therefore they can be connected in a state inhibiting separation of the strands 213 and in a state where the end faces of the end portions 214B are in contact with each other that is as stable as possible.

Figure 24:
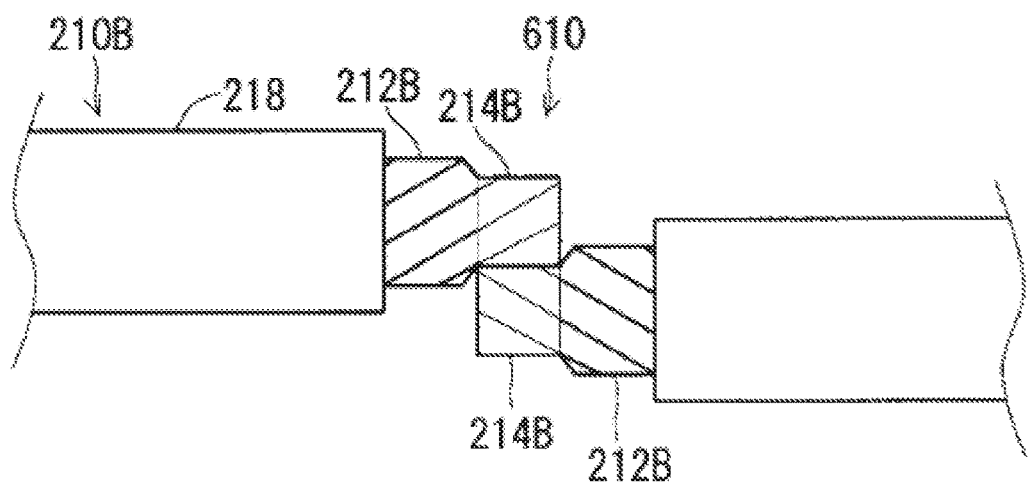
FIG. 24 is a side view illustrating another connection structure of the electrical wires.

Also, a connection structure 610 of the electrical wire 210B illustrated in FIG. 24 includes a plurality (two) of the electrical wires 210B. The end portions 214B are connected to each other in a state where one surface on an outer circumference of the end portion 214B of one electrical wire 210B has the end portion 214B of the other electrical wire 210B overlaid thereon. The connection is created by welding such as laser welding, ultrasonic welding, or resistance welding, or by soldering or the like.

In the case of this example, the end portions 214B where the plurality of strands 213 are compressed and collected are stacked on each other and can be connected by welding, soldering, or the like, and therefore they can be connected in a state inhibiting separation of the strands 213 and in a state where the end portions 214B are in contact with each other that is as stable as possible.

In the present embodiment, the cutting targets 214 and 214a (the portion which, after cutting, becomes the end portions 214B) have a shape where the thickness dimension gradually decreases from both side edge portions toward the width-direction middle portion, and accordingly the two side edge portions are formed in a shape with the smallest thickness dimension, although this is not strictly necessary.

Figure 25:
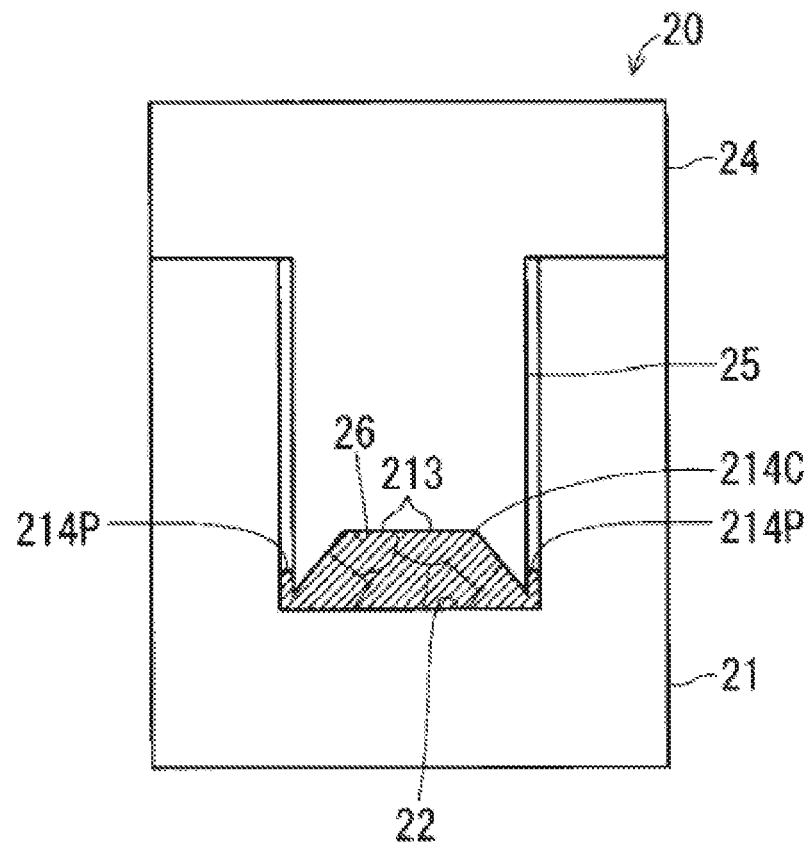
FIG. 25 is an explanatory diagram illustrating a step of forming a cutting target according to a modification.

For example, when the plurality of strands 213 are compressed by the metal die 20, the strands 213 may enter between two lower edge portions of the projection 25 of the upper mold 24 and the two side surfaces of the lower mold surface 22 of the lower mold 21. Strands 213 that have entered between the two lower edge portions of the projection 25 of the upper mold 24 and the two side surfaces of the lower mold surface 22 of the lower mold 21 fill the gap between these elements, and therefore an excessively large force may be required when removing the upper mold 24 from the lower mold 21. In addition, strands 213 that have entered between the two lower edge portions of the projection 25 of the upper mold 24 and the two side surfaces of the lower mold surface 22 of the lower mold 21 may form a pointed portion that stands upright on the two side edge portions of the cutting target 214 and 214a, and therefore the pointed portions may damage other portions. In view of this, as illustrated in FIG. 25, a case may be considered where the width of the projection 25 of the upper mold 24 is configured to be smaller than a space between the two side surfaces of the lower mold surface 22, and the strands 213 readily enter between the two lower edge portions of the projection 25 of the upper mold 24 and the two side surfaces of the lower mold surface 22 of the lower mold 21, by design. In this case, a gap of a certain size is formed between the two lower edge portions of the projection 25 of the upper mold 24 and the two side surfaces of the lower mold surface 22 of the lower mold 21 by design, and therefore even when a few of the strands 213 enter this space, the strands 213 are unlikely to get tightly compressed, and therefore the upper mold 24 is readily removed from the lower mold 21. In addition, even when the strands 213 enter between the two lower edge portions of the projection 25 of the upper mold 24 and the two side surfaces of the lower mold surface 22 of the lower mold 21, a projection 214P that is formed by the strands 213 that have entered this gap has a certain thickness and, moreover, is not compressed from above, and therefore the projection 214P is not very pointed and ordinarily is formed into a shape with a slightly rounded leading edge portion. Therefore, the projection 214P is unlikely to damage other portions.

In this case, a cutting target 214C has a shape where the projection 214P, which projects upward, is formed on the two side edge portions of the cutting target 214.

Figure 26:
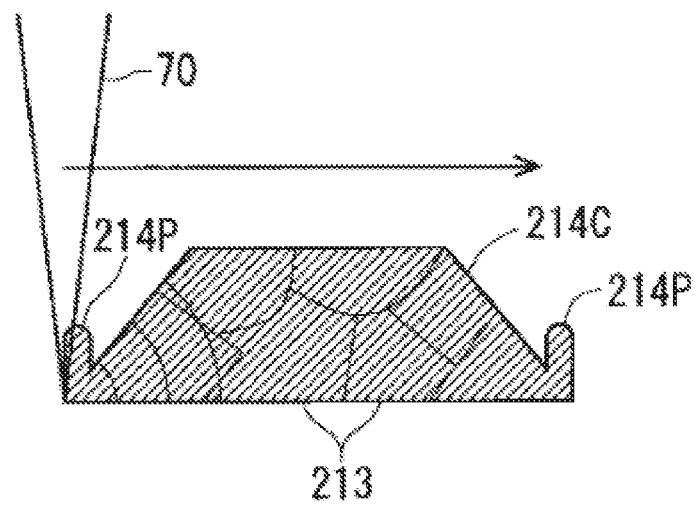
FIG. 26 is an explanatory diagram illustrating a step of cutting the cutting target according to the modification.

In a case where the cutting target 214C is cut by the high energy-density beam as described above, in the initial period of the displacement path of the laser beam 70, the laser beam 70 is fired at the projection 214P, as illustrated in FIG. 26, for example. When this happens, because the projection 214P is small, even when a sufficient amount of heat is difficult to impart in the initial period of the displacement path of the laser beam 70, there is no significant effect and the portion that includes the projection 214P can be cut. In addition, when the laser beam 70 moves to the other side portion of the cutting target 214C, as noted above, heat can be imparted cumulatively while cutting portions where the thickness dimension progressively increases.

In this way, when the cutting target, in a cross-sectional view thereof, has a portion that is processed such that the thickness dimension gradually increases, so long as the high energy-density beam is fired across that portion in the direction in which the thickness dimension gradually increases, the effects noted above can be achieved. Therefore, there is no need for the portion that is processed such that the thickness dimension gradually increases to start from either of the edge portions of the cutting target.

Third Embodiment

A method of manufacturing a conductive member, a long conductive member, and a conductive member according to a third embodiment are described. In the description of the present embodiment, configuration elements that are similar to those described in the first or second embodiment are assigned the same reference numerals and the explanation thereof is omitted, and the description primarily focuses on differences from the first or second embodiment.

First, a manufacturing method of a conductive member is described.

Figure 27:
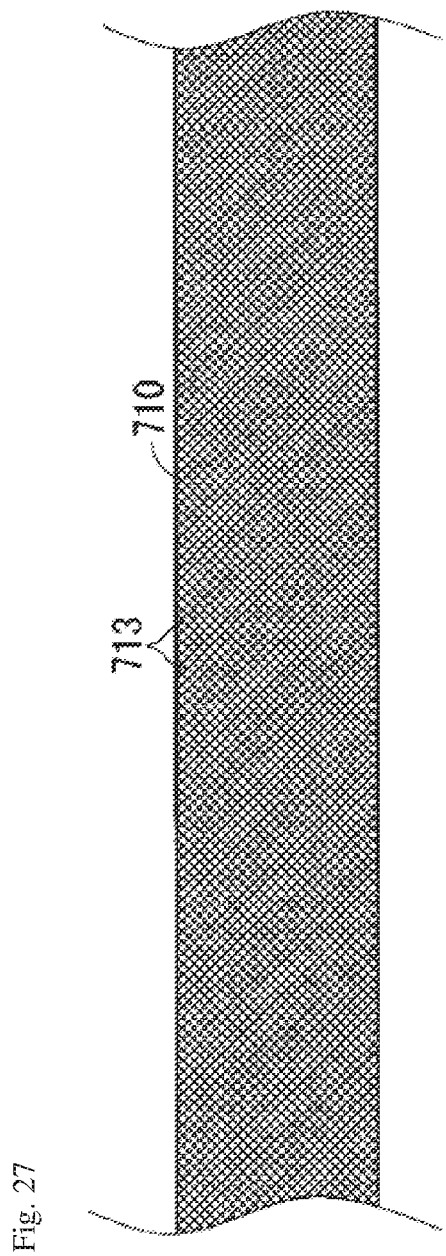
FIG. 27 is a schematic side view illustrating a long conductive member according to a third embodiment.

As illustrated in FIG. 27, a long conductive member 710 is prepared.

In the present embodiment, the long conductive member 710 is a braided wire in which a plurality of strands 713 are braided in a tubular form. The plurality of strands may also be braided in a sheet form. Similar to the second embodiment, the strands 713 are formed of a metal wire such as aluminum, an aluminum alloy, copper, or a copper alloy, and plating such as tin plating may be formed on the surface of each of the strands 713.

Figure 28:
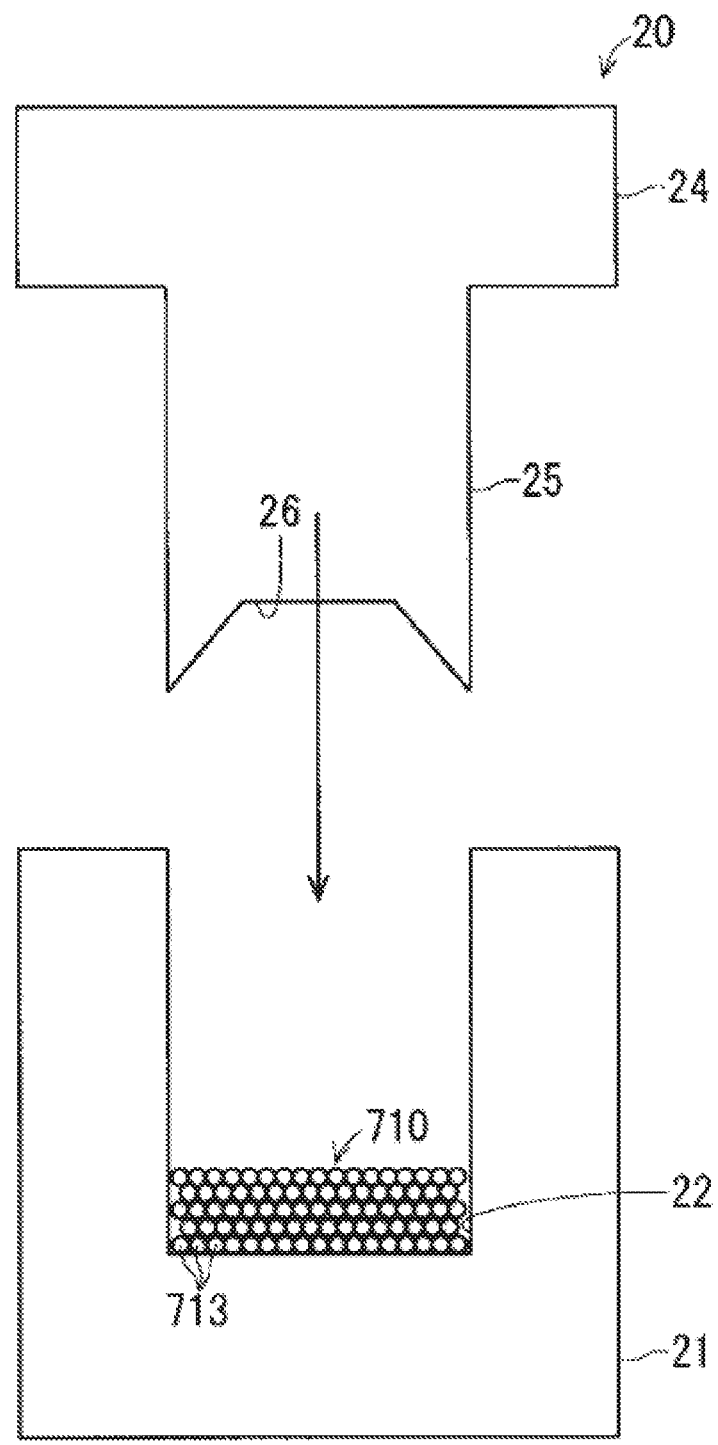
FIG. 28 is an explanatory diagram illustrating a step of forming a cutting target in the long conductive member.
Figure 29:
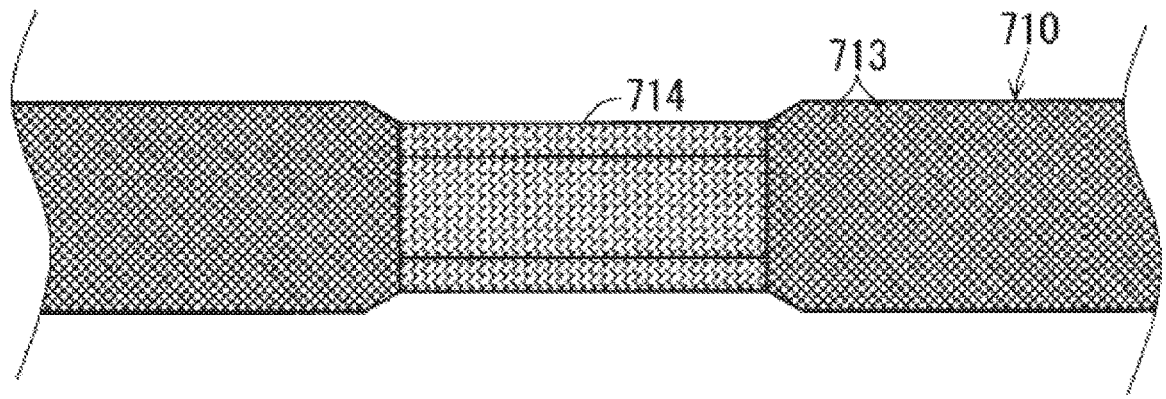
FIG. 29 is a schematic plan view illustrating a state where the cutting target is formed in the long conductive member.

As illustrated in FIGS. 28 and 29, an extension-direction middle portion of the long conductive member 710 is formed into a cutting target 714 (step (a)). Similar to the description given in the first or second embodiment, this step can be performed using the metal die 20 that includes the lower mold 21 and the upper mold 24, for example. Specifically, in a state where the middle portion of the long conductive member 710 is accommodated within the lower mold surface 22, the projection 25 presses in from above the lower mold surface 22 and applies pressure so as to compress the extension-direction middle portion of the long conductive member 710 between the lower mold surface 22 and the upper mold surface 26. When this happens, pressure is applied to each of the strands 713 at the extension-direction middle portion of the long conductive member 710, the strands 713 go through an elastic deformation region, are plastically deformed, and are collected, and are formed into the cutting target 714, which has a shape corresponding to the shape of the space delineated by the lower mold surface 22 and the upper mold surface 26 (see FIG. 29). Each of the strands 713 initially have a flat cross-section, but when pressure is applied in the compression direction, the strands 713 deform between the lower mold surface 22 and the upper mold surface 26 so as to fill gaps between each of the strands 713, and pressure is applied to the plurality of strands 713 to create a state where the strands 713 are more tightly packed than other portions. Through this deformation, a newly formed surface is created on the surface of each of the strands 713, and each of the strands 713 cohere to each other. Accordingly, the cutting target 714 is formed in which the plurality of strands 713 are maintained in a collected form. The shape of the cutting target 714 is the same as the shape of the cutting target 14 described in the first embodiment.

Step (a) in which the cutting target 714 is formed as described above preferably includes a step where the plurality of strands 713 are bonded to each other. In the present embodiment, the cutting target 714 undergoes non-pressure welding to form a cutting target 714a.

Figure 30:
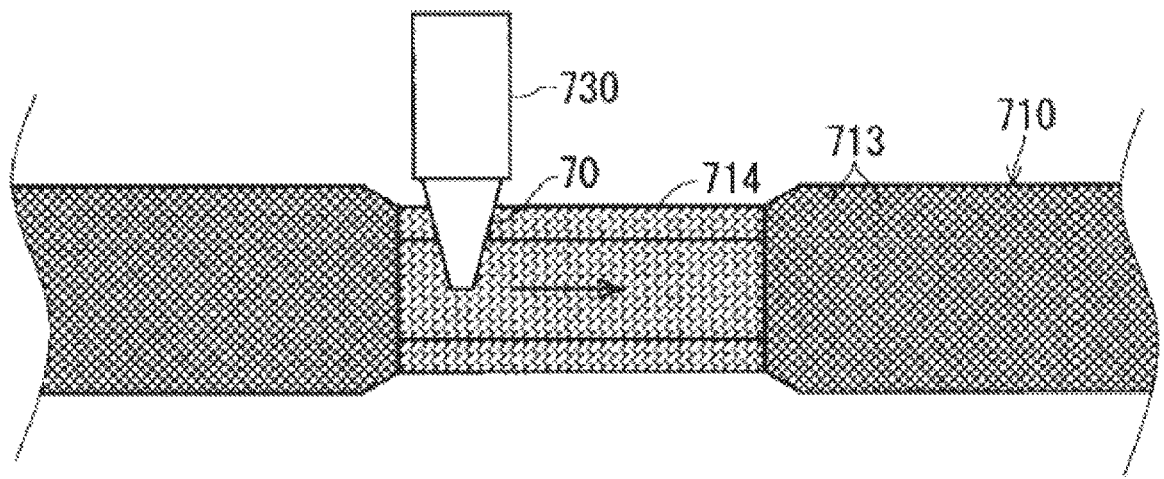
FIG. 30 is an explanatory diagram illustrating a step of bonding strands of the cutting target together.

In this example, a similar method to that described in the second embodiment can be employed for the non-pressure welding. Here, as illustrated in FIG. 30, the plurality of strands 713 are welded to each other by laser welding, in which the laser beam 70 is fired from a nozzle 730 onto the cutting target 714 and the strands 713 are welded to each other.

The cutting target 714a formed in this way is formed in a shape having a shaped portion where, in a cross-sectional view orthogonal to the extension direction of the cutting target 714a, similar to the cutting target 214a of the second embodiment (see FIG. 17), the thickness dimension gradually increases in the width direction on the two side surfaces 14a as compared to substantially circular cross-section portions of the long conductive member 710 other than the cutting target 714a.

Figure 31:
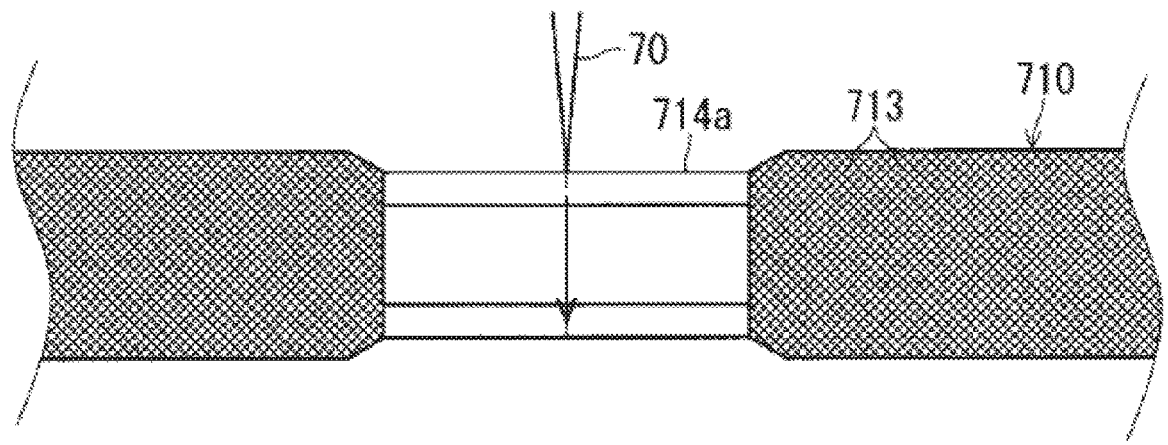
FIG. 31 is an explanatory diagram illustrating a step of cutting the cutting target.

Also, as illustrated in FIG. 31, a high energy-density beam (in this example, the laser beam 70) is fired at the cutting target 714a while moving in the direction in which the thickness dimension of the cutting target 714a gradually increases, and cuts the cutting target 714a (step (b)).

Figure 32:
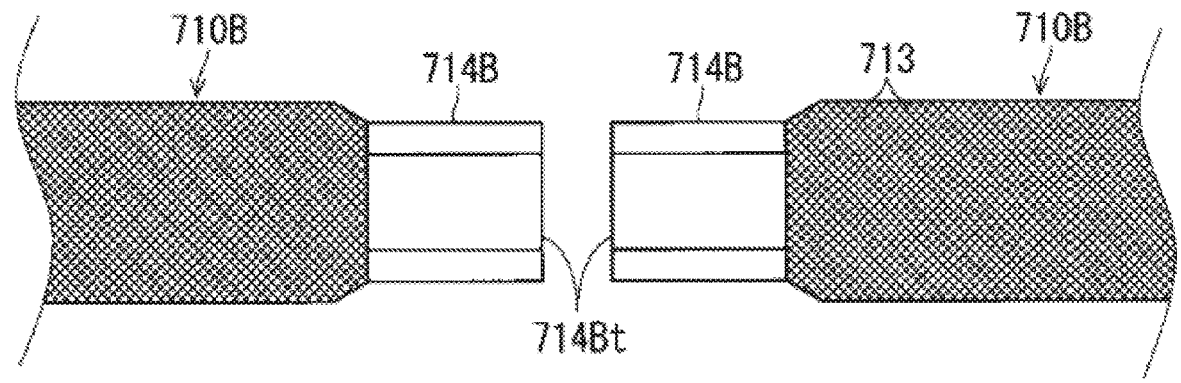
FIG. 32 is a schematic plan view illustrating conductive members.

When this happens, as illustrated in FIG. 32, a conductive member 710B is produced that is formed of a conductive material in an elongated shape, and an end portion 714B (end face) on at least one side thereof is formed in a shape having two side portions where the thickness dimension gradually increases. Thermal cutting marks 714Bt made by the high energy-density beam are formed on the end face of the end portion 714B, similar to the first and second embodiments. The plurality of strands 713 are collected and maintained in a tightly packed state at the end portion 714B. A plurality of the conductive members 710B having the end portion 714B formed at both ends can be produced by forming the cutting target 714a at a plurality of locations, with intervals between, in the extension direction of the long conductive member 710 and cutting the extension-direction middle portion of each of the cutting targets 714a as described above.

A terminal is connected to the end portion 714B of the conductive member 710B by crimping, welding, soldering, or the like, similar to the second embodiment, or the other conductive member 710B, the electrical wire 210B, or the like is brought opposite or stacked on the end portion 714B of the conductive member 710B and is connected by welding or the like.

Effects similar to those of the first and second embodiments can also be achieved according to the third embodiment.

{Modifications}

Figure 33:
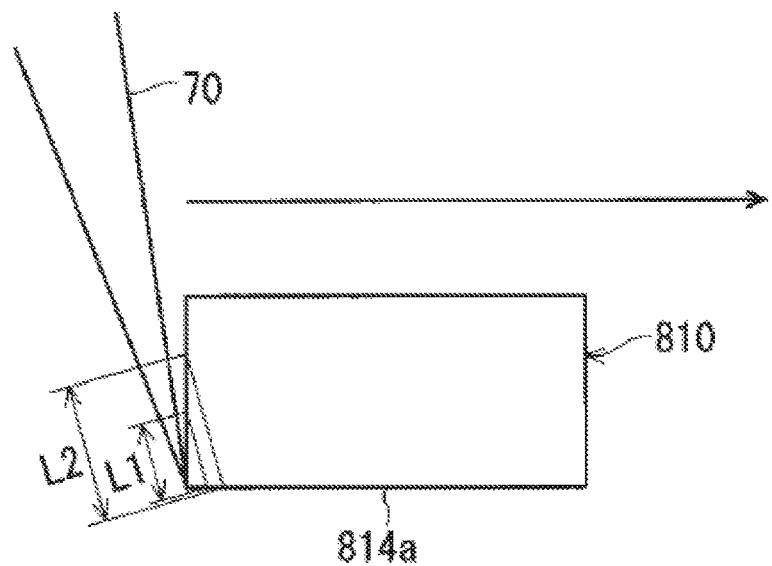
FIG. 33 is an explanatory diagram illustrating a step of cutting a long conductive member according to a modification.

As in the modification illustrated in FIG. 33, a cutting target 814 of a long conductive member 810 may also be formed in a rectangular shape in a cross-sectional view orthogonal to the extension direction of the long conductive member 810. In this case, the laser beam 70 favorably moves while firing along a direction that is oblique printing relative to the four circumferential faces of the cutting target 14.

In the example illustrated in FIG. 33, the cross-sectional shape of the cutting target 814 is formed in a long rectangle in which a length dimension of one opposite sides (long side) is longer than the length dimension of the other opposite sides (short side). The laser beam 70 is fired along an oblique direction that is non-perpendicular to both the long side and the short side. In addition, the laser beam moves in this firing posture along a direction that traverses the cutting target 814 along the extension direction of the long side, for example.

Figure 34:
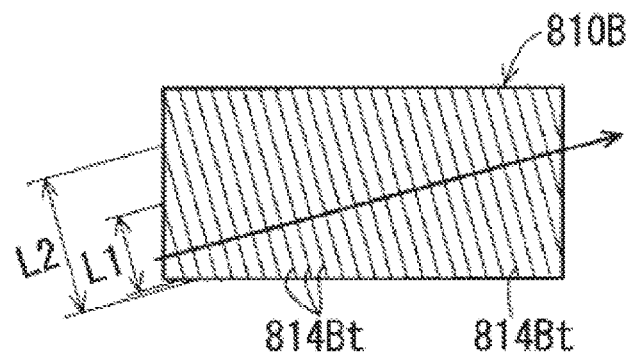
FIG. 34 illustrates an end face of a conductive member according to the modification.

Thermal cutting marks 814Bt of the laser beam 70 forming striated unevenness, as illustrated in FIG. 34, are formed on an end face of an end portion 814B of the long conductive member 810B after cutting. The thermal cutting marks 814Bt extend in a direction that is oblique with respect to the four circumferential sides of the end face. Also, dimensions L1 and L2 along the extension direction of the thermal cutting marks 814Bt gradually grow larger in a direction orthogonal to the extension direction of the thermal cutting marks 814Bt.

In this case also, the dimensions L1 and L2 of the cutting target 814 in the firing direction of the laser beam 70 gradually increase at, at least, a portion where the laser beam 70 moves (in this example, at the initial period). Therefore, similar to each of the above embodiments, even at the initial period of the displacement path of the laser beam 70, the side edge portion on one side of the cutting target 814 can easily be completely cut even without increasing the output of the laser beam 70 or slowing the displacement speed. In addition, from a midway point onward in the displacement path of the laser beam 70, heat imparted to the displacement path of the laser beam 70 up to that point builds up cumulatively, and therefore a portion of the cutting target 814 where the thickness dimension is comparatively large (at or after a point in time where the laser beam 70 has reached the upper long side) can easily be completely cut. As a result, the long conductive member 810 can be more completely cut in as short a time as possible by a high energy-density beam with as low an output as possible. Accordingly, a low-output laser processing device can also be used, and a high-output laser processing device can be used at a low output and its lifespan can be extended.

In addition, midway along or at a terminal end of the displacement path, the cumulative heat up to that point accumulates in the cutting target 814, and therefore even when the laser beam moves more quickly than in the initial period of cutting, the energy density applied to the cut portion can be equivalent to the initial period of the displacement path. Therefore, by moving the laser beam more quickly midway along or at a terminal end of the displacement path than in the initial period of cutting up to that point, cutting can also be accomplished in a shorter amount of time as compared to cutting at a fixed displacement speed.

As can be understood from each of the above embodiments, the modifications, and the like, according to a method of manufacturing a conductive member that includes (a) a step of preparing a long conductive member provided with a cutting target in an extension direction portion, and (b) a step of firing a high energy-density beam at the cutting target while moving the high energy-density beam in a direction that intersects with the extension direction of the long conductive member, and also cutting the cutting target at, at least, a portion where the high energy-density beam moves, such that a dimension of the cutting target in the firing direction of the high energy-density beam gradually increases, a long conductive member can be more completely cut in as short a time as possible by a high energy-density beam with as low an output as possible. In this case, preferably, the gradual increase in the dimension of the cutting target in the firing direction of the high energy-density beam is in the first half of the displacement path over which the cutting of the cutting target is performed, and more preferably is in the initial period of movement.

When observing an end face of the conductive member after cutting in this case, striated thermal cutting marks made by the high energy-density beam are formed, and moreover, the end face is formed in a shape having a portion where the dimension along the extension direction of the thermal cutting marks gradually increases in a direction orthogonal to the extension direction of the thermal cutting marks.

Each configuration described in each of the above embodiments and each of the modifications can be combined as appropriate so long as they do not contradict each other. For example, in the third embodiment, a projection similar to the projection 214P described in the second embodiment may also be formed on the two side portions of the cutting target. Also, in the modification illustrated in FIGS. 33 and 34, the conductive member may also be formed by a single conductive member, or may be formed by a collection of a plurality of conductive members.

In the above, the present invention is described in detail. However, the above description is, in all aspects, for exemplary purposes and the present invention is not limited thereto. Numerous modifications not given as examples are understood to be conceivable without departing from the scope of the present invention.

DESCRIPTION OF REFERENCE NUMERALS

10, 110, 710, 810 Long conductive member
10B, 710B, 810B Conductive member
10C, 310, 410 Terminal-equipped conductive member
14, 214, 214a, 214C, 714, 714a, 814a Cutting target
14B, 214B, 714B, 814B End portion
14Bt, 214Bt, 714Bt, 814Bt Thermal cutting mark
30, 330, 430 Terminal
32, 332 Wire connection portion
70 Laser beam
210, 210B Electrical wire
212, 212B Core wire
212a Core wire exposure portion
213, 713 Strand
510, 610 Connection structure

The invention claimed is:

1. A method of manufacturing a conductive member comprising:
preparing a long conductive member provided with a cutting target in an extension direction portion; and
firing a high energy-density beam at the cutting target while moving the high energy-density beam in a direction that intersects with the extension direction of the long conductive member, and cutting the cutting target at, at least, a portion where the high energy-density beam moves, such that a dimension of the cutting target in a firing direction of the high energy-density beam gradually increases, wherein
an extension direction portion of the long conductive member is formed as the cutting target, which has a portion that is processed such that a thickness dimension gradually increases in a cross-sectional view orthogonal to the extension direction of the long conductive member, and
the high energy-density beam is fired at the cutting target while moving in the direction in which the thickness dimension gradually increases, and cuts the cutting target.

2. The method of manufacturing the conductive member according to claim 1, wherein the extension direction portion of the long conductive member is formed as the cutting target, which has a portion that is processed such that, in a cross-sectional view orthogonal to the extension direction of the long conductive member, the thickness dimension gradually increases from two sides thereof toward a middle portion thereof.

3. The method of manufacturing the conductive member according to claim 1, wherein the extension direction portion of the long conductive member is formed as the cutting target, which has a portion where, in a cross-sectional view orthogonal to the extension direction of the long conductive member, the thickness dimension is fixed at a width-direction middle portion thereof.

4. The method of manufacturing the conductive member according to claim 1, wherein the extension direction portion of the long conductive member is formed as the cutting target, in which a cross-sectional view orthogonal to the extension direction of the long conductive member exhibits a trapezoidal shape.

5. The method of manufacturing the conductive member according to claim 1, wherein a cutting target is prepared which is rectangular in a cross-sectional view orthogonal to the extension direction of the long conductive member, and the high energy-density beam is fired along a direction that is oblique with respect to four faces of the cutting target.

6. The method of manufacturing the conductive member according to claim 1, wherein the long conductive member is a member that includes a plurality of strands forming a wire shape, and
preparing the long conductive member includes applying pressure to the plurality of strands.

7. The method of manufacturing the conductive member according to claim 6, wherein preparing the long conductive member includes bonding the plurality of strands to each other.

8. The method of manufacturing the conductive member according to claim 1, wherein a displacement speed of the high energy-density beam increases partway through.

9. The method of manufacturing the conductive member according to claim 1, further comprising:

connecting the cutting target that is cut to a terminal.

10. A conductive member that is formed of a conductive material in an elongated shape, comprising:

striated thermal cutting marks made by a high energy-density beam formed on an end face on at least one side of the conductive member, and the end face being formed in a shape having a trapezoidal portion that includes a portion that is processed such that a thickness dimension gradually increases from two sides thereof toward a middle portion thereof, and a portion where the thickness dimension is fixed at a width-direction middle portion thereof, wherein a direction orthogonal to an extension direction of the thermal cutting marks is a direction oriented from one side of the end face toward the other side, and the conductive member is a member that includes a plurality of strands forming a wire shape, and, at the end face, pressure is applied to the plurality of strands, so that the strands are more tightly packed than other portions.

11. The conductive member according to claim 10, wherein, at the end face, the plurality of strands are bonded to each other.

12. The conductive member according claim 10, wherein a terminal is connected to an end portion.

\* \* \* \* \*